(12) United States Patent
De Gobbi et al.

(10) Patent No.: US 12,535,201 B2
(45) Date of Patent: Jan. 27, 2026

(54) CROWN DECK LIGHTING SYSTEM

(71) Applicant: Nabors Drilling Technologies USA, Inc., Houston, TX (US)

(72) Inventors: Robert De Gobbi, Tomball, TX (US); David B. Powell, Spring, TX (US)

(73) Assignee: NABORS DRILLING TECHNOLOGIES USA, INC., Houston, TX (US)

( * ) Notice: Subject to any disclaimer, the term of this patent is extended or adjusted under 35 U.S.C. 154(b) by 0 days.

(21) Appl. No.: 18/846,486

(22) PCT Filed: Mar. 15, 2023

(86) PCT No.: PCT/US2023/064407
§ 371 (c)(1),
(2) Date: Sep. 12, 2024

(87) PCT Pub. No.: WO2023/178159
PCT Pub. Date: Sep. 21, 2023

(65) Prior Publication Data
US 2025/0198606 A1 Jun. 19, 2025

Related U.S. Application Data

(60) Provisional application No. 63/269,500, filed on Mar. 17, 2022.

(51) Int. Cl.
*F21V 21/28* (2006.01)
*F21S 8/00* (2006.01)
(Continued)

(52) U.S. Cl.
CPC ............... *F21V 21/28* (2013.01); *F21S 8/03* (2013.01); *F21W 2131/1005* (2013.01); *F21W 2131/402* (2013.01); *F21W 2131/403* (2013.01)

(58) Field of Classification Search
CPC ... F21V 21/28; F21S 8/03; F21W 2131/1005; F21W 2131/402; F21W 2131/403
(Continued)

(56) References Cited

U.S. PATENT DOCUMENTS

| 2,232,268 A | 2/1941 | Rawson |
| 2,895,039 A | 7/1959 | Hutchison |

(Continued)

FOREIGN PATENT DOCUMENTS

| CA | 2851391 | 4/2014 |
| CA | 2928251 | 6/2015 |

(Continued)

OTHER PUBLICATIONS

International Search Report and Written Opinion for PCT/US2023/064407, mailed Jul. 3, 2023, 10 pages.
(Continued)

*Primary Examiner* — Laura K Tso
(74) *Attorney, Agent, or Firm* — Haynes and Boone, LLP

(57) ABSTRACT

A system that can include a crown deck with a handrail positioned along an outer perimeter, a support structure mounted to the crown deck, where the support structure can horizontal supports rigidly attached to vertical supports, the horizontal supports being supported at a vertical elevation above the crown deck by the vertical supports, which are welded to a top surface of the crown deck, with light fixture assemblies mounted to the horizontal supports, with each one of the light fixture assemblies being rotatable, relative to the horizontal supports, between a stowed position and a deployed position, where the stowed position locates a respective one of the light fixture assemblies radially spaced away from the outer perimeter of the crown deck and toward a center of the crown deck.

20 Claims, 18 Drawing Sheets

(51) Int. Cl.
    *F21W 131/10*     (2006.01)
    *F21W 131/402*     (2006.01)
    *F21W 131/403*     (2006.01)

(58) Field of Classification Search
    USPC .................................................. 362/382
    See application file for complete search history.

(56) References Cited

U.S. PATENT DOCUMENTS

| | | |
|---|---|---|
| 2,983,341 A | 5/1961 | Selberg et al. |
| RE25,730 E | 2/1965 | Minor |
| 3,218,446 A | 11/1965 | Langer |
| D208,106 S | 7/1967 | Partlow |
| 3,439,467 A | 4/1969 | Partlow |
| 3,952,467 A | 4/1976 | Partlow |
| 4,937,717 A | 6/1990 | Betzvog, Jr. |
| 5,272,611 A | 12/1993 | Lai |
| 5,521,852 A | 5/1996 | Hibbs et al. |
| 6,585,400 B2 | 7/2003 | Leen |
| 6,957,832 B1 | 10/2005 | Pannekoek |
| 7,566,151 B2 | 7/2009 | Whelan et al. |
| 7,690,822 B2 | 4/2010 | Kauffman |
| 7,988,343 B2 | 8/2011 | Palmisano, Jr. |
| 8,419,207 B2 | 4/2013 | Smith |
| 8,734,163 B1 | 5/2014 | Gordin et al. |
| 8,814,221 B2 | 8/2014 | Grant |
| 8,840,264 B2 | 9/2014 | Molina et al. |
| 8,911,116 B2 | 12/2014 | Blincoe et al. |
| 9,097,957 B2 | 8/2015 | Pohlert et al. |
| 9,316,390 B2 | 4/2016 | Gowanlock et al. |
| D757,343 S | 5/2016 | Dupuis et al. |
| 9,353,924 B2 | 5/2016 | Scarlata et al. |
| 10,125,935 B2 | 11/2018 | Gowanlock et al. |
| 10,145,544 B2 | 12/2018 | Gowanlock et al. |
| 10,215,331 B2 | 2/2019 | Sharrah et al. |
| 10,356,886 B1 | 7/2019 | Cooley et al. |
| 10,374,451 B2 | 8/2019 | Curlett |
| 10,401,006 B2 | 9/2019 | Kennedy |
| 10,473,282 B2 | 11/2019 | Allison et al. |
| 10,473,310 B2 | 11/2019 | Carroll |
| 10,514,160 B2 | 12/2019 | Verdes et al. |
| D877,952 S | 3/2020 | Gordin et al. |
| 10,598,359 B2 | 3/2020 | Pannekoek et al. |
| 10,690,327 B2 | 6/2020 | Blackwelder et al. |
| 10,711,961 B2 | 7/2020 | Allison et al. |
| 10,883,684 B1 | 1/2021 | Allison et al. |
| 10,900,626 B2 | 1/2021 | Allison et al. |
| 10,962,180 B2 | 3/2021 | Cacciabeve |
| 10,976,016 B2 | 4/2021 | Allison et al. |
| 11,111,761 B1 | 9/2021 | Gowanlock |
| 11,300,260 B2 | 4/2022 | Allison et al. |
| 11,391,121 B2 | 7/2022 | Gowanlock |
| 11,408,603 B2 | 8/2022 | Curlett et al. |
| 2008/0310162 A1 | 12/2008 | Thomas et al. |
| 2009/0190356 A1 | 7/2009 | Kauffman |
| 2012/0201015 A1 | 8/2012 | Robertson et al. |
| 2013/0328302 A1 | 12/2013 | Grant |
| 2015/0153036 A1 | 6/2015 | Gowanlock et al. |
| 2015/0184840 A1 | 7/2015 | Gowanlock et al. |
| 2015/0280489 A1 | 10/2015 | Curlett |
| 2016/0109079 A1 | 4/2016 | McKinley et al. |
| 2016/0258601 A1 | 9/2016 | Gowanlock |
| 2017/0023195 A1 | 1/2017 | Gowanlock et al. |
| 2017/0254106 A1 | 9/2017 | Bruinsma |
| 2018/0010748 A1 | 1/2018 | Gowanlock |
| 2018/0163956 A1 | 6/2018 | Gowanlock |
| 2018/0187873 A1 | 7/2018 | Carroll |
| 2018/0266637 A1 | 9/2018 | Curlett et al. |
| 2019/0242218 A1 | 8/2019 | Gowanlock |
| 2019/0285235 A1 | 9/2019 | Allison et al. |
| 2019/0285236 A1 | 9/2019 | Allison et al. |
| 2020/0011496 A1 | 1/2020 | Allison et al. |
| 2020/0072451 A1 | 3/2020 | Carroll |
| 2020/0084862 A1 | 3/2020 | Chalmers et al. |
| 2021/0025580 A1 | 1/2021 | Curlett et al. |
| 2021/0381344 A1 | 12/2021 | Gowanlock |
| 2022/0357028 A1 | 11/2022 | Curlett et al. |
| 2023/0123401 A1 | 4/2023 | Gowanlock |

FOREIGN PATENT DOCUMENTS

| | | |
|---|---|---|
| CA | 3034206 | 3/2018 |
| CA | 3096128 | 10/2019 |
| CN | 2075255 U | 4/1991 |
| CN | 202108420 U | 1/2012 |
| CN | 202195446 U | 4/2012 |
| CN | 203215413 U | 4/2012 |
| CN | 203336518 U | 9/2013 |
| CN | 105756568 A | 7/2016 |
| CN | 214619338 U | 11/2021 |
| KR | 20180111720 A | 10/2018 |
| WO | 2015077871 A1 | 6/2015 |
| WO | WO 2016/120699 | 8/2016 |
| WO | WO 2017/017565 | 2/2017 |
| WO | WO 2018/020400 | 2/2018 |
| WO | WO 2018/042348 | 3/2018 |
| WO | WO 2019/191843 | 10/2019 |
| WO | 2023178159 A1 | 9/2023 |

OTHER PUBLICATIONS

Nabors Prior Art Drilling Rigs, NABORS_009842 through NABORS_009856; 15 pages (2003).

Hazardous Location LED White Down Light, Dialight, https://web.archive.org/web/20071026102106/http://www.dialight.com/pdf/HazardousAreaLighting/MDTPC1D2WF001_F-W.pdf; 2 pages (Oct. 2007).

ENFORM's Lease Lighting Guideline, ENFORM; 40 pages (Jun. 2012).

Facebook post, Nemalux Industrial, https://www.facebook.com/Nemalux/photos/a.335346039847172/536328073082300/; 1 page(Jul. 2013).

Swivelpole Product Catalogue NEC V2-4, Swivelpole Group Pty Ltd, https://web.archive.org/web/20140401034738/http://swivelpole.com/us/download/unrestricted/Swivelpole-North-American-Catalogue.pdf; 28 pages (Mar. 2014).

Industrial fittings—V-Spring™ telescoping light pole, Crouse-Hinds, https://web.archive.org/web/20141212153818/http://www.cooperindustries.com/content/dam/public/crousebinds/resources/pdfs/literature/vspring-brochure.pdf; 8 pages (Dec. 2014).

Nemalux LED Lighting, Nemalux, https://web.archive.org/web/20160605062151/http://nemalux.com/wp-content/uploads//2015/08/ZLMs.pdf; 6 pages(Jun. 2016).

Swivelpole™ Catalog, Swivelpole Group Pty Ltd, https://web.archive.org/web/20170407045723/http://swivelpole.com/us/download/unrestricted/Swivelpole-Catalog-NEC.pdf; 24 pages (Mar. 2017).

Dialight LED Lighting Fixture Catalog for Industrial and Hazardous Locations, Dialight, https://web.archive.org/web/20170628064027/http://www.dialight.com/Assets/Brochures_And_Catalogs/Illumination/MDTFSHCATX001.pdf; 92 pages (Jun. 2017).

Apollo Energy Services Corp., https://web.archive.org/web/20170710021659/http://www.apolloenergy.ca/; 1 page (Jul. 2017).

Apollo Lighting Solutions Inc.'s Proposal No. 18-10-2017, NABORS_005721; 4 pages (Oct. 2017).

Class 1 Div 2 Safe Sitetm Series LED White Downlight, Dialight, https://web.archive.org/web/20071026102048/http://www.dialight.com/pdf/HazardousAreaLighting/MDTFC1D2HZC002 B-W.pdf; 2 pages (Oct. 2007).

*Nabors Drilling Techs. USA, Inc. v. C&M Oilfield Rentals, LLC*, No. 4:22-cv-02140 (S.D. Tex. 2022)[1].

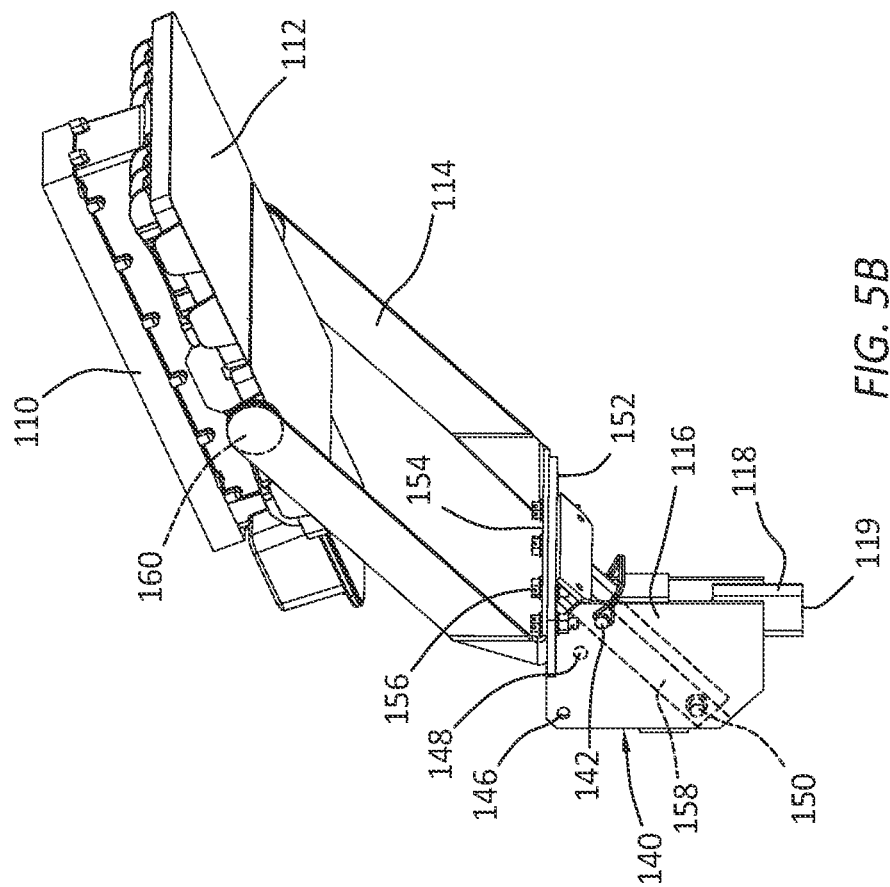
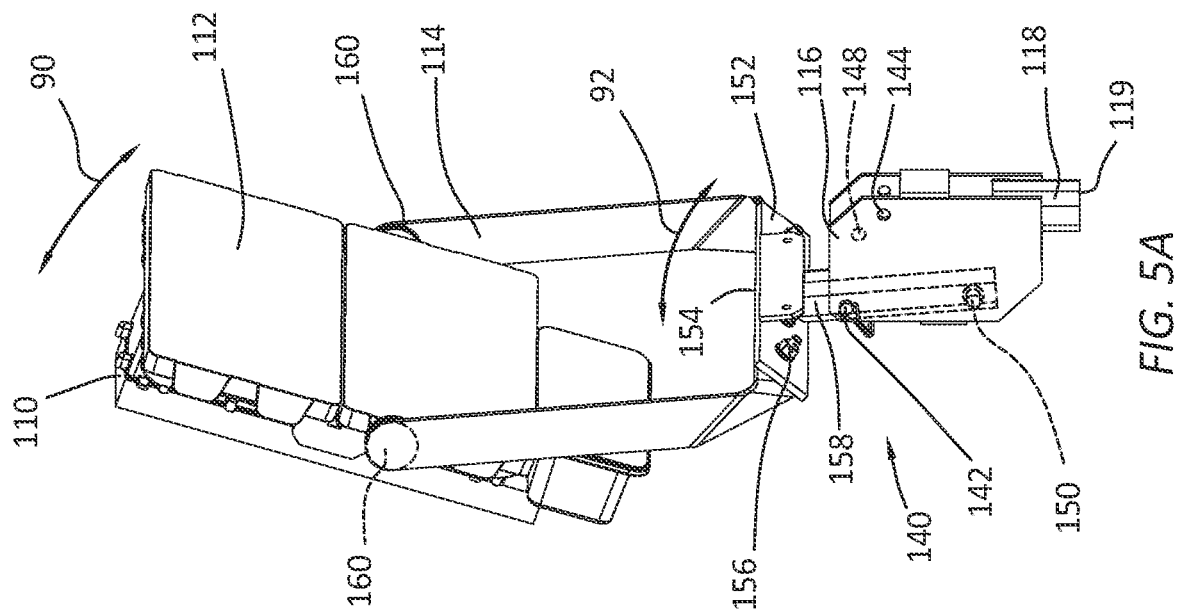
FIG. 5B
FIG. 5A

CROWN DECK LIGHTING SYSTEM

CROSS-REFERENCE TO RELATED APPLICATIONS

This application is a National Stage entry under 35 U.S.C. § 371 of International Application No. PCT/US2023/064407, filed Mar. 15, 2023, entitled "CROWN DECK LIGHTING SYSTEM," by Robert DE GOBBI et al., which claims priority under 35 U.S.C. § 119 (e) to U.S. Provisional Application No. 63/269,500 filed Mar. 17, 2022, entitled "CROWN DECK LIGHTING SYSTEM," by Robert DE GOBBI et al., all of which are assigned to the current assignee hereof and incorporated herein by reference in their entireties.

TECHNICAL FIELD

The present invention relates, in general, to the field of drilling and processing of wells. More particularly, present embodiments relate to a system and method for illuminating a rig site, including a rig, being used to perform subterranean operations.

BACKGROUND ART

Drilling rigs are very expensive to operate, therefore, it is usually desirable to run the drilling rigs 24 hours a day, 7 days a week. This requires operation of the rig during times of the day that do not provide adequate illumination of the rig site. Even during idle periods on the rig, such as between subterranean operations, personnel may continue to perform operations around the rig site to clean-up, prepare for the next subterranean operation, repair equipment, replace equipment, etc. Operations being performed in inadequate illumination are a real safety concern and can result in severe injury to individuals at the rig site or damage to rig site equipment. Therefore, improvements in lighting systems for rig sites are continually needed.

BRIEF DESCRIPTION OF THE DRAWINGS

These and other features, aspects, and advantages of present embodiments will become better understood when the following detailed description is read with reference to the accompanying drawings in which like characters represent like parts throughout the drawings, wherein:

FIG. 5A is a representative perspective view of a lighting fixture assembly in a stowed position, in accordance with certain embodiments;

FIG. 5B is a representative perspective view of a lighting fixture assembly in a deployed position, in accordance with certain embodiments;

DETAILED DESCRIPTION OF THE PREFERRED EMBODIMENT(S)

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

The use of the word "generally," "about," "approximately," or "substantially" is intended to mean that a value of a parameter is close to a stated value or position. However, minor differences may prevent the values or positions from being exactly as stated. Thus, differences of up to ten percent (10%) for the value are reasonable differences from the ideal goal of exactly as described. A significant difference can be when the difference is greater than ten percent (10%).

Figure 1:
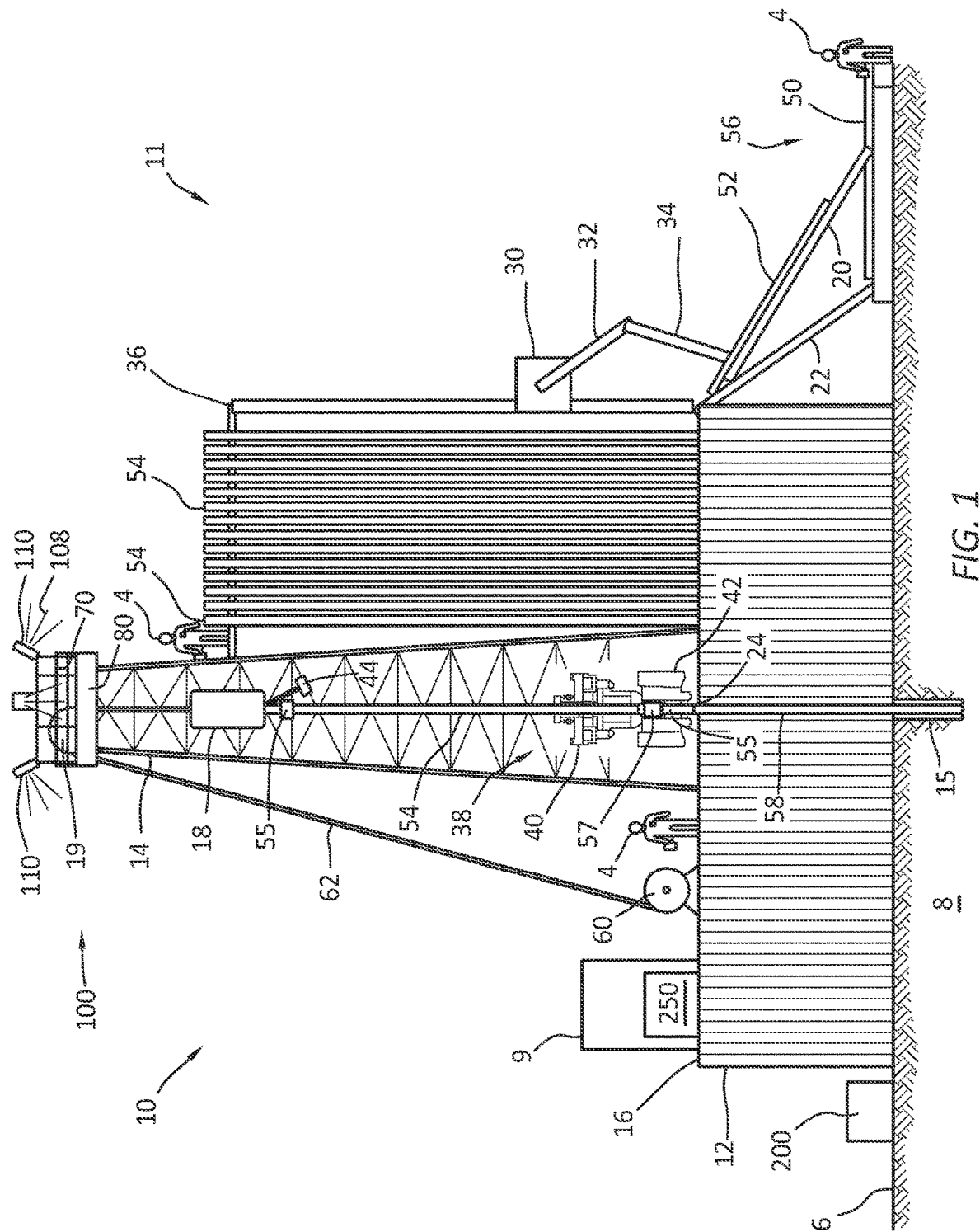
FIG. 1 is a representative simplified front view of a rig at a rig site being utilized for a subterranean operation with lighting on a crown deck, in accordance with certain embodiments.

As used herein, "tubular" refers to an elongated cylindrical tube and can include any of the tubulars manipulated around a rig, such as tubular segments, tubular stands, tubulars, and tubular string, but not limited to the tubulars shown in FIG. 1. Therefore, in this disclosure, "tubular" is synonymous with "tubular segment," "tubular stand," and "tubular string," as well as "pipe," "pipe segment," "pipe stand," "pipe string," "casing," "casing segment," or "casing string."

FIG. 1 is a representative simplified front view of a rig 10 at a rig site 11 being utilized for a subterranean operation (e.g., tripping in or out a tubular string to or from a wellbore), in accordance with certain embodiments. The rig site 11 can include the rig 10 with its rig equipment, along with equipment and work areas that support the rig 10 but are not necessarily on the rig 10. The rig 10 can include a platform 12 with a rig floor 16 and a derrick 14 extending up from the rig floor 16. The derrick 14 can provide support for hoisting the top drive 18 as needed to manipulate tubulars, such as using a drawworks 60, a crown block 19, and a cable 62 for lifting or lowering the top drive 18. A catwalk 20 and V-door ramp 22 can be used to transfer horizontally stored tubular segments 50 to the rig floor 16. A tubular segment 52 can be one of the tubular segments 50 that was stored in a horizontal storage area 56 and is being transferred to the rig floor 16 via the catwalk 20. A pipe handler 30 with articulating arms 32, 34 can be used to grab the tubular segment 52 from the catwalk 20 and transfer the tubular segment 52 to the top drive 18, the fingerboard 36, the wellbore 15, etc. However, it is not required that a pipe handler 30 be used on the rig 10. The top drive 18 can transfer tubulars directly to and directly from the catwalk 20 (e.g., using an elevator coupled to the top drive).

The rig 10 can also include a crown deck lighting (CDL) system 100 mounted to the crown deck 80 and mounted inside a handrail 70 of the crown deck 80. It should be understood that the CDL system can also be mounted to the derrick structure and extend above the crown deck 80 without being welded directly to the crown deck 80. Alternatively, or in addition to, vertical supports (e.g., 122, 123, 124 of FIGS. 3, 7, 10,) of the CDL system can be mounted directly to a top surface 82 of the crown deck 80 or mounted through the top surface 82 to a substructure of the crown deck 80 and connected to the top surface 82. Therefore, as used herein, the "top surface 82" refers to a top surface 82 of the crown deck 80 or a substructure of the crown deck 80 that is below the top surface 82 and is accessed through an opening in the top surface 82. If the vertical supports are mounted through an opening in the top surface 82, it is still preferred that the vertical supports be at least partially welded to the top surface 82. The CDL system 100 can provide lighting to the entire rig site 11 (or at least a portion of the rig site 11) via the illumination 108 projected from each of the multiple light fixture assemblies 110 of the CDL system 100. The CDL system 100 can be configured to include one or more light fixture assemblies 110 mounted on one or more sides of CDL system 100. Each CDL system 100 can be tailored to accommodate various crown decks, but the CDL system does not provide adjustable horizontal supports. Even though the CDL system can be cut off one crown block 80 and welded to another crown deck 80, this is not considered adjustable. As used herein, "adjustable" refers to adjusting a length of a support and thereby a horizontal outer dimension of the support structure 120 without welding.

The tubular string 58 can extend into the wellbore 15, with the wellbore 15 extending through the surface 6 into the subterranean formation 8. When tripping the tubular string 58 into the wellbore 15, tubulars 54 are sequentially added to the tubular string 58 to extend the length of the tubular string 58 into the earthen formation 8. FIG. 1 shows a land-based rig. However, it should be understood that the principles of this disclosure are equally applicable to offshore rigs where "off-shore" refers to a rig with water between the rig floor and the earth surface 6.

When tripping the tubular string 58 out of the wellbore 15, tubulars 54 are sequentially removed from the tubular string 58 to reduce the length of the tubular string 58 in the wellbore 15. The pipe handler 30 can be used to remove the tubulars 54 from an iron roughneck 38 or a top drive 18 (or elevator 44 coupled to the top drive 18) at a well center 24 and transfer the tubulars 54 to the catwalk 20, the fingerboard 36, etc. The iron roughneck 38 can break a threaded connection between a tubular 54 being removed and the tubular string 58. A spinner assembly 40 can engage a body of the tubular 54 to spin a pin end 57 of the tubular 54 out of a threaded box end 55 of the tubular string 58, thereby unthreading the tubular 54 from the tubular string 58.

When tripping the tubular string 58 into the wellbore 15, tubulars 54 are sequentially added to the tubular string 58 to increase the length of the tubular string 58 in the wellbore 15. The pipe handler 30 can be used to deliver the tubulars 54 to a well center on the rig floor 16 in a vertical orientation and hand the tubulars 54 off to an iron roughneck 38 or a top drive 18 or an elevator 44. The iron roughneck 38 can make a threaded connection between the tubular 54 being added and the tubular string 58. A spinner assembly 40 can engage a body of the tubular 54 to spin a pin end 57 of the tubular 54 into a threaded box end 55 of the tubular string 58, thereby threading the tubular 54 into the tubular string 58. The wrench assembly 42 can provide a desired torque to the threaded connection, thereby completing the connection.

While tripping a tubular string into and out of the wellbore 15 can be a significant part of the operations performed by the rig, many other rig tasks are also needed to perform a well construction according to a digital well plan. For example, pumping mud, via pump(s), at desired rates, maintaining downhole pressures (as in managed pressure drilling), maintaining and controlling rig power systems, coordinating and managing personnel on the rig during operations, performing pressure tests on sections of the wellbore 15, cementing casing string in the wellbore, performing well logging operations, treating mud via a treatment system, as well as many other rig tasks. The CDL system 100 can provide illumination of the rig site 11 to allow individuals 4 to support these subterranean operations with improved safety due to the improved lighting.

A rig controller 250 can be used to control the rig 10 operations including controlling various rig equipment, such as the pipe handler 30, the top drive 18, the iron roughneck 38, the fingerboard equipment, imaging systems, various other robots on the rig 10 (e.g., a drill floor robot), rig power systems 200, or the CDL system 100. The rig controller 250 can control the rig equipment autonomously (e.g., without periodic individual 4 interaction,), semi-autonomously (e.g., with limited individual 4 interaction such as initiating a subterranean operation, adjusting parameters during the operation, etc.), or manually (e.g., with the individual 4 interactively controlling the rig equipment via remote control interfaces to perform the subterranean operation).

The rig controller 250 can include one or more processors with one or more of the processors distributed about the rig 10, such as in an operator's control hut 9, in the pipe handler 30, in the iron roughneck 38, in the vertical storage area 36, in the imaging systems, in various other robots, in the top drive 18, at various locations on the rig floor 16 or the derrick 14 or the platform 12, at a remote location off of the rig 10, at downhole locations, etc. It should be understood that any of these processors can perform control or calculations locally or can communicate to a remotely located processor for performing the control or calculations. Each of the processors can be communicatively coupled to a non-transitory memory, which can include instructions for the respective processor to read and execute to implement the desired control functions, as well as methods described in this disclosure. These processors can be coupled via a wired or wireless network.

The rig controller 250 can collect data from various data sources around the rig (e.g., sensors, user input, local rig reports, etc.) and from remote data sources (e.g., suppliers, manufacturers, transporters, company men, remote rig reports, etc.) to monitor and facilitate the execution of a digital well plan. A digital well plan is generally designed to be independent of a specific rig, where a digital rig plan is a digital well plan that has been modified to incorporate the specific equipment available on a specific rig to execute the well plan on the specific rig, such as rig 10. Therefore, the rig controller 250 can be configured to monitor and facilitate the execution of the digital well plan by monitoring and executing rig tasks in the digital rig plan. The digital rig plan can include tasks of controlling the CDL system 100.

Figure 2:
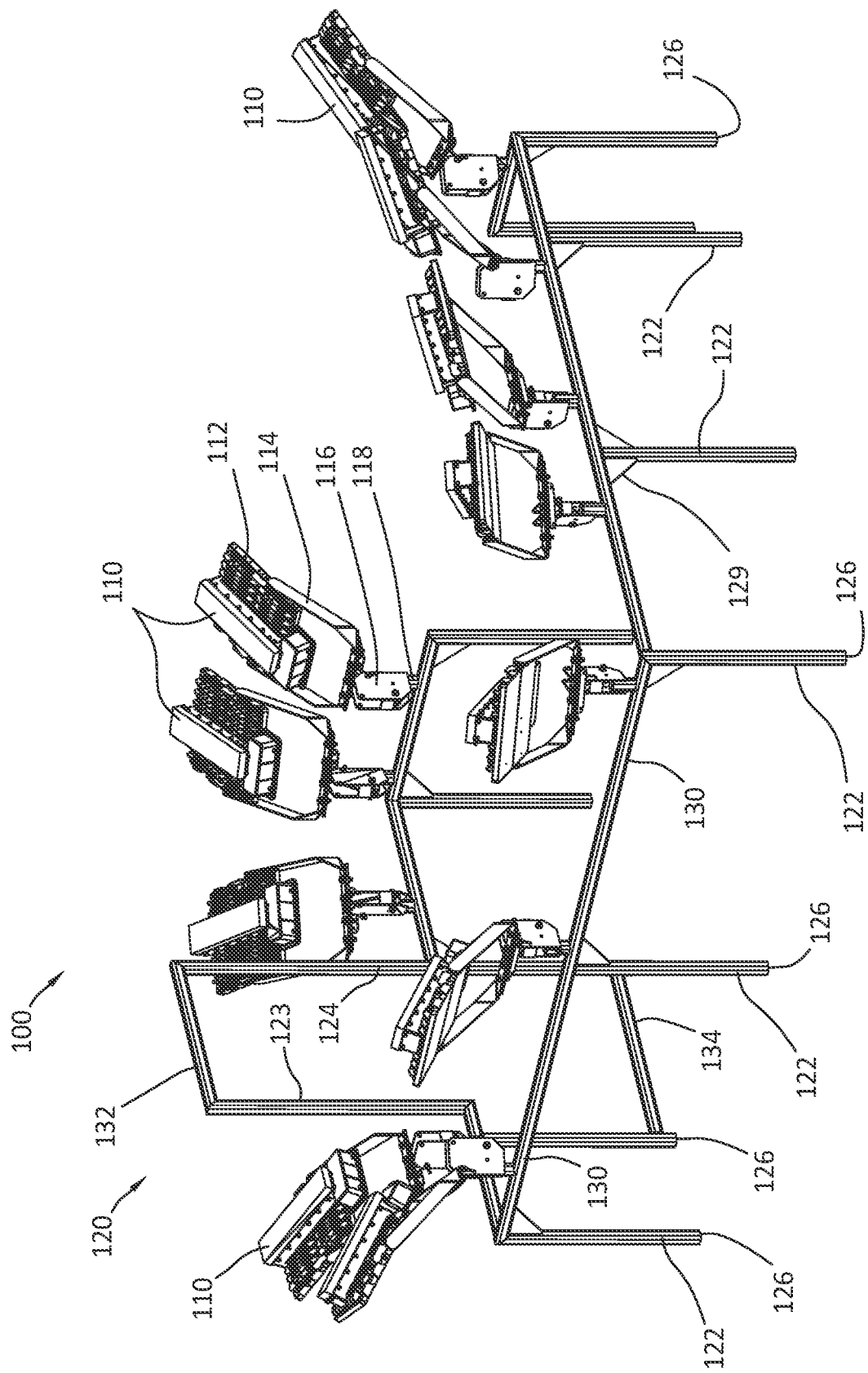
FIG. 2 is a representative perspective view of a crown deck lighting (CDL) system configured for attachment to a crown deck, in accordance with certain embodiments.

FIG. 2 is a representative perspective view of a CDL system 100 configured for attachment to a crown deck 80. The CDL system 100 can include a support structure 120 with one or more horizontal supports 130, 132, or 134 and multiple vertical supports 122, 123, or 124 constructed as a single structure with the supports 122, 123, 124, 130, 132, 134 being integral to the support structure 120. One or more light fixture assemblies 110 can be mounted to the horizontal supports 130, 132, via a light fixture support 118, which can be welded to the horizontal supports 130, 132 and a light fixture attachment 116 which can be welded to the light fixture support 118. Each light fixture assembly 110 can include a light 112 rotationally attached to a light fixture bracket 114 that can be generally U-shaped. However, it should be understood that other shapes can be used to provide the bracket 114 for the lighting fixture assemblies 110.

The light fixture bracket 114 can be adjustably attached to the light fixture attachment 116. The support 118 can be removably attached to the horizontal supports 130, 132 via a clamp (not shown) so that the light fixture assembly 110 can be moved along one of the horizontal supports 130, 132, to position the light fixture assembly 110 at various positions on the one of the horizontal supports 130, 132. However, it is preferred to weld the support 118 to one of the horizontal supports 130, 132 and weld the attachment 116 to the support 118. In a non-limiting embodiment, the attachment 116 can be welded directly to the horizontal supports 130, 132 without using a support 118. Each of the vertical supports 122, 123, or 124 can include a bottom surface 126 that is welded to the crown deck top surface 82, thereby securing the vertical supports 122, 123, or 124 to the crown deck 80. It should be understood that the vertical supports 122, 123, or 124 can include a bottom surface 126 that is welded to the derrick 14 instead of the crown deck 80 or a combination of both, thereby securing the vertical supports 122, 123, or 124 to the rig 10.

The support structure 120 (and possibly the CDL system 100) can be assembled as a single unit and installed on the crown deck top surface 82 as a single unit. Alternatively, the support structure 120, including the light fixture supports 118, can be assembled as a single unit and installed on the crown deck top surface 82 as a single unit, with the light fixture attachment 116 and the light fixture assemblies 110 added after the support structure 120 is welded to the top surface 82 of the crown deck 80. Alternatively, the support structure 120, including the light fixture supports 118 and the light fixture attachments 116, can be assembled as a single unit and installed on the crown deck top surface 82 as a single unit, with the light fixture assemblies 110 added after the support structure 120 is welded to the top surface 82 of the crown deck 80. Alternatively, the CDL system 100 can be installed on the top surface 82 of the crown deck 80 by separately attaching individual pieces or sub-assemblies of pieces together to form the CDL system 100 (i.e., build the CDL system 100 in place on the crown deck 80).

The support structure 120 can include the vertical and horizontal supports 122, 123, 124, 130, 132, and 134, the optional gussets 129, the optional light fixture supports 118, and the light fixture attachments 116. Each light fixture assembly 110 can include a U-shaped light fixture bracket 114, to which a light 112 can be mounted. The light 112 can be selectively rotated relative to the bracket 114 (e.g., when attachment fasteners are loosened), and can be selectively rotationally fixed to the bracket 114 (e.g., when attachment fasteners are tightened).

Figure 3:
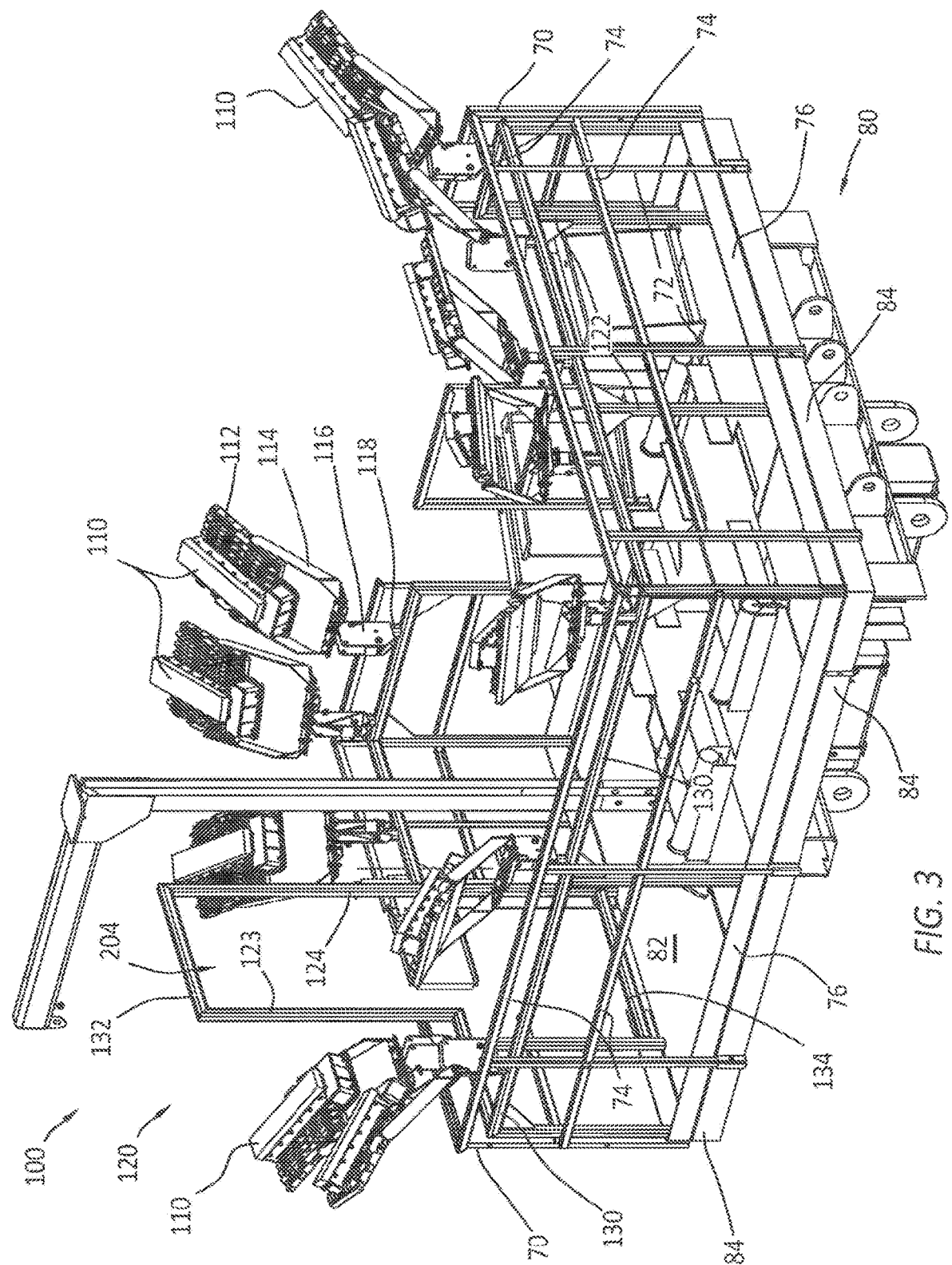
FIG. 3 is a representative perspective view of the CDL system of FIG. 2 installed on a crown deck, in accordance with certain embodiments.

FIG. 3 is a representative perspective view of the CDL system of FIG. 1 installed on the crown deck 80. In this non-limiting embodiment, the crown deck 80 can include four sides 84 and a handrail 70 that can extend around a major portion of the perimeter of the crown deck 80. The handrail 70 can include vertical supports 72, horizontal supports 74, and a kick plate 76. The CDL system 100 is installed on the top surface 82 of the crown deck 80 just inside the handrail 70 and does not contact the handrail 70 (i.e., is spaced away from the handrail 70). The horizontal supports 130 of the CDL system 100 are disposed at a lower vertical elevation than the top horizontal supports 74 of the handrail 70, yet it is not required that the horizontal supports 130 be disposed at a lower vertical elevation than the top horizontal supports 74 of the handrail 70. The light fixture assemblies 110 can extend from the horizontal supports 130 to position the lights 112 above the top horizontal supports 74. The lights 112 can be leaned out over the top horizontal supports 74 and generally directed in a downward angle toward at least a portion of the rig site 11.

In this non-limiting embodiment, the CDL system 100 forms an opening 204 through which an individual 4 can pass through when moving between the crown deck 80 and possibly a ladder leading up to the crown deck 80. The horizontal support 134 can be held at a vertical elevation by the vertical supports 123, 124. The vertical support 124 is shown to extend from the vertical support 134 all the way down to the top surface 82, while the vertical support 123 can extend from the horizontal support 134 to a horizontal support 130, which is held at a vertical elevation above the crown deck top surface 82 by one or more vertical supports 122. However, it should be understood that various other configurations of vertical and horizontal supports can be used in assembling the CDL system 100 on a crown deck top surface 82 in keeping with the principles of this disclosure.

Please note that neither the vertical nor horizontal supports of the CDL system 100 are connected to or in contact with handrail 70. The CDL system 100 is mounted inside the handrail 70, when a handrail 70 is included on the crown deck 80. The horizontal and vertical supports 122, 123, 124, 130, 132, 134 can be used to route conductors, for power and control, to the lights 112. By running conductors in the supports, this can reduce trip hazards on the crown deck 80, especially in a traffic area like where the horizontal support 134 is positioned.

Figure 4A:
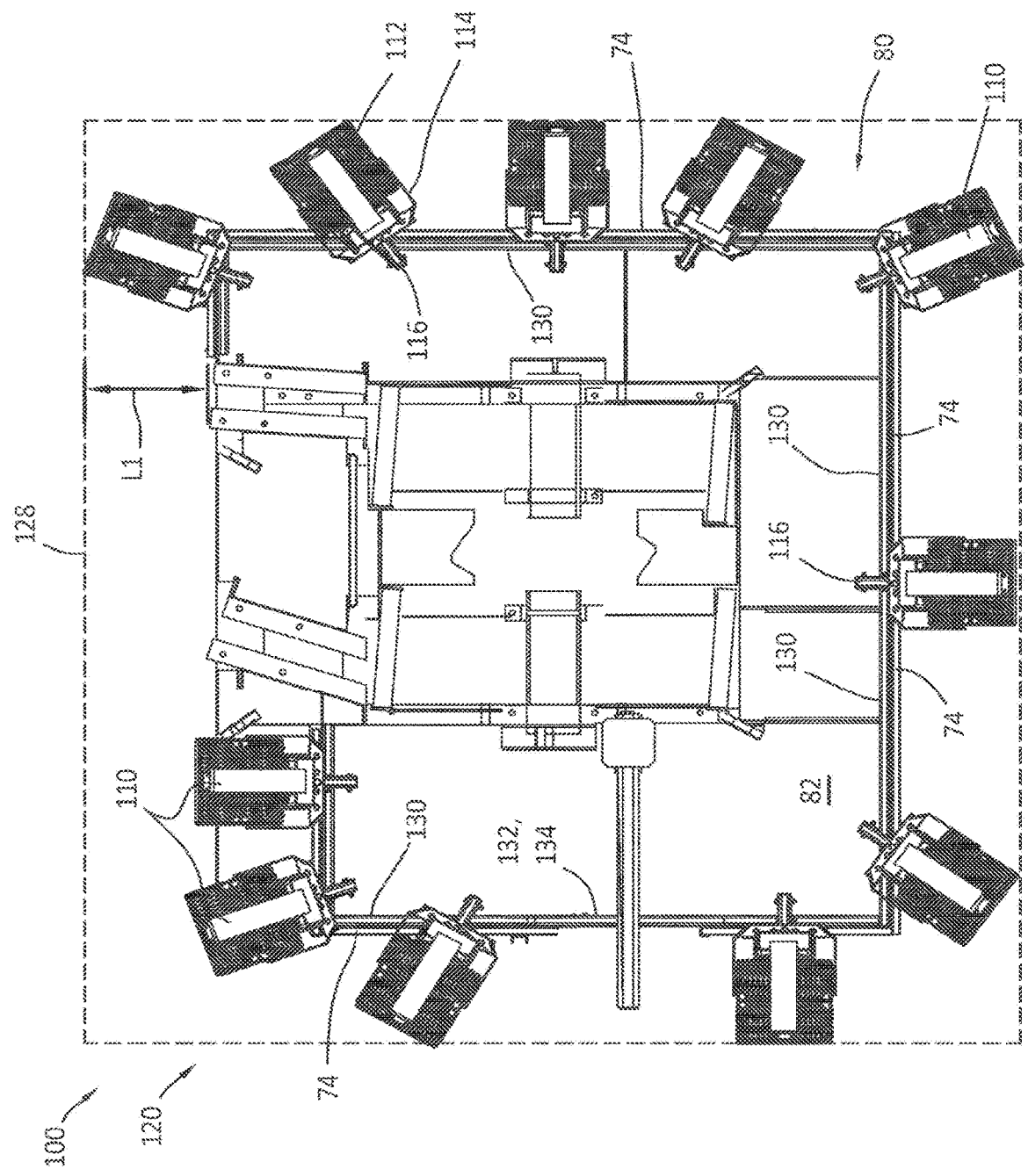
FIGS. 4A, 4B are representative top views of the CDL system of FIG. 2 on a crown deck in a deployed configuration (FIG. 4A) or in a stowed configuration (FIG. 4B), in accordance with certain embodiments.

FIG. 4A is a representative top view of the CDL system 100 of FIG. 1 on a crown deck 80 in a deployed configuration. In this non-limiting embodiment, the CDL system 100 is in a deployed configuration (i.e., each of the lights 112 in a deployed position), the lights 112 can form an outer perimeter 128 that is larger than the perimeter formed by the handrail 70. The length L1 can represent the maximum distance that the lights 112 radially extend past the handrail 70. Each light 112 is not required to extend radially outward by the maximum length L1. This merely represents the maximum length L1 of the lights 112 that are extended radially outward. The rest of the lights 112 can be radially extended at or below the maximum length L1.

Figure 4B:
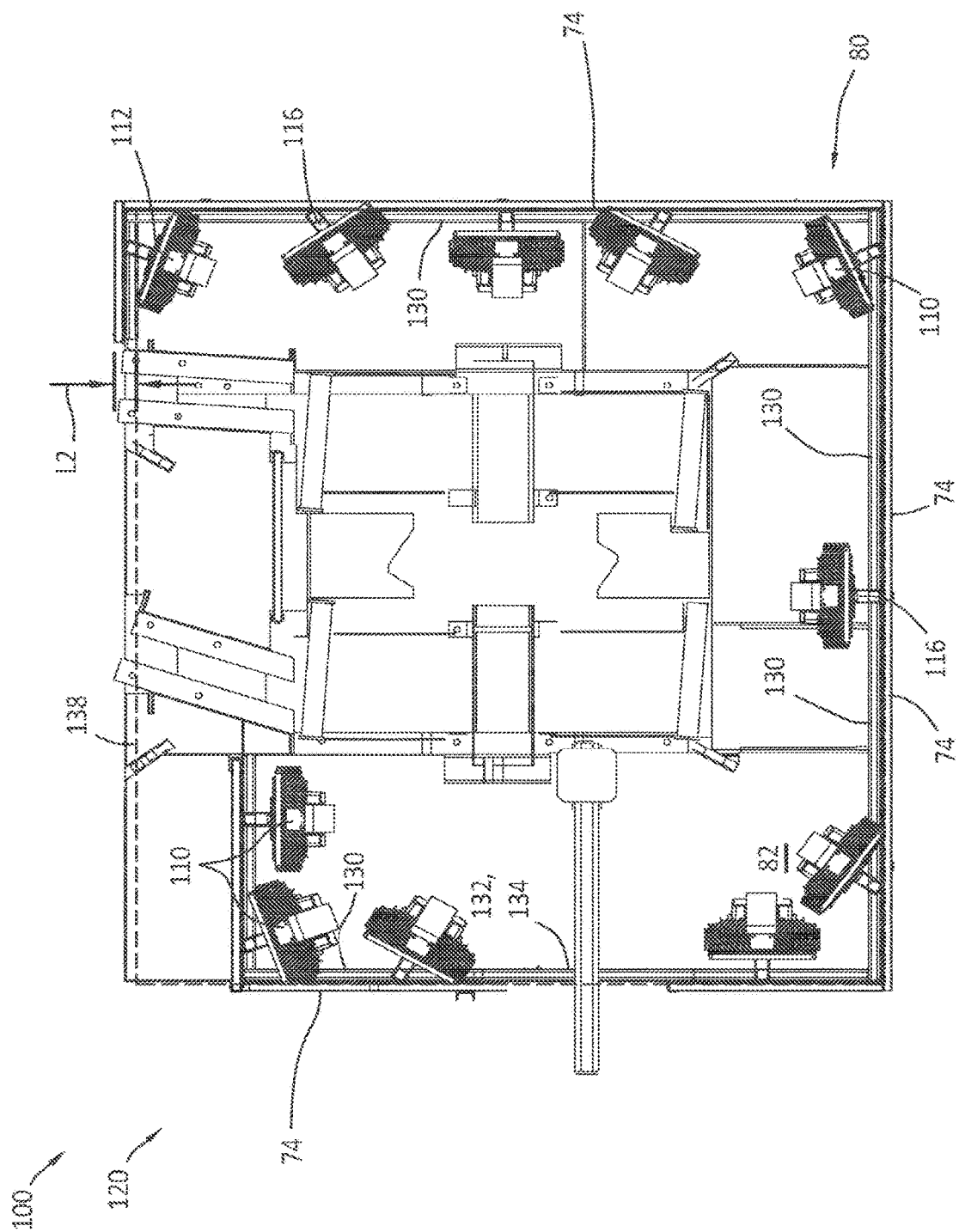

FIG. 4B is a representative top view of the CDL system 100 of FIG. 1 on a crown deck 80 in a stowed configuration. With the CDL system 100 in a stowed configuration (i.e., each of the lights 112 in a stowed position), the lights 112 can form an outer perimeter 138 that is smaller than the perimeter formed by the handrail 70. The length L2 can represent the minimum distance that the lights 112 radially inward from an outer perimeter formed by the handrail 70. Each light 112 can extend at or above the minimum length L2 from an outer perimeter formed by the handrail 70. The stowed position is used to protect the lights 112 when the crown deck 80 is removed from the rig 10 and transported to another rig site 11 to be assembled onto another rig 10 at the new rig site 11.

FIG. 5A is a representative perspective view of a lighting fixture assembly 110 in a stowed position, while FIG. 5B is a representative perspective view of a lighting fixture assembly in at least one deployed position. The lighting fixture assembly 110 can include a light 112 that is rotationally attached to the bracket 114 at pivot points 160 on either side of the light 112. The light 112 can include one or more lights. It is preferred that the light 112 is selectively rotatable relative to the bracket 114. When rotated (arrows 90) into the desired azimuthal orientation relative to the bracket 114, the light can be rotationally fixed to the bracket 114 by tightening a fastener at the pivot 160. When the fastener is loosened, then the light 112 is allowed to rotate relative to the bracket 114, which allows azimuthal adjustments of the light 112 relative to the bracket 114 until the fastener at the pivots 160 are once again tightened, thereby preventing further rotation of the light 112 relative to the bracket 114. The lights 112 can be used with any of the embodiments of CDL systems 100 described in this disclosure, as well as other CDL systems 100 that are similar to these described herein.

Figure 11A:
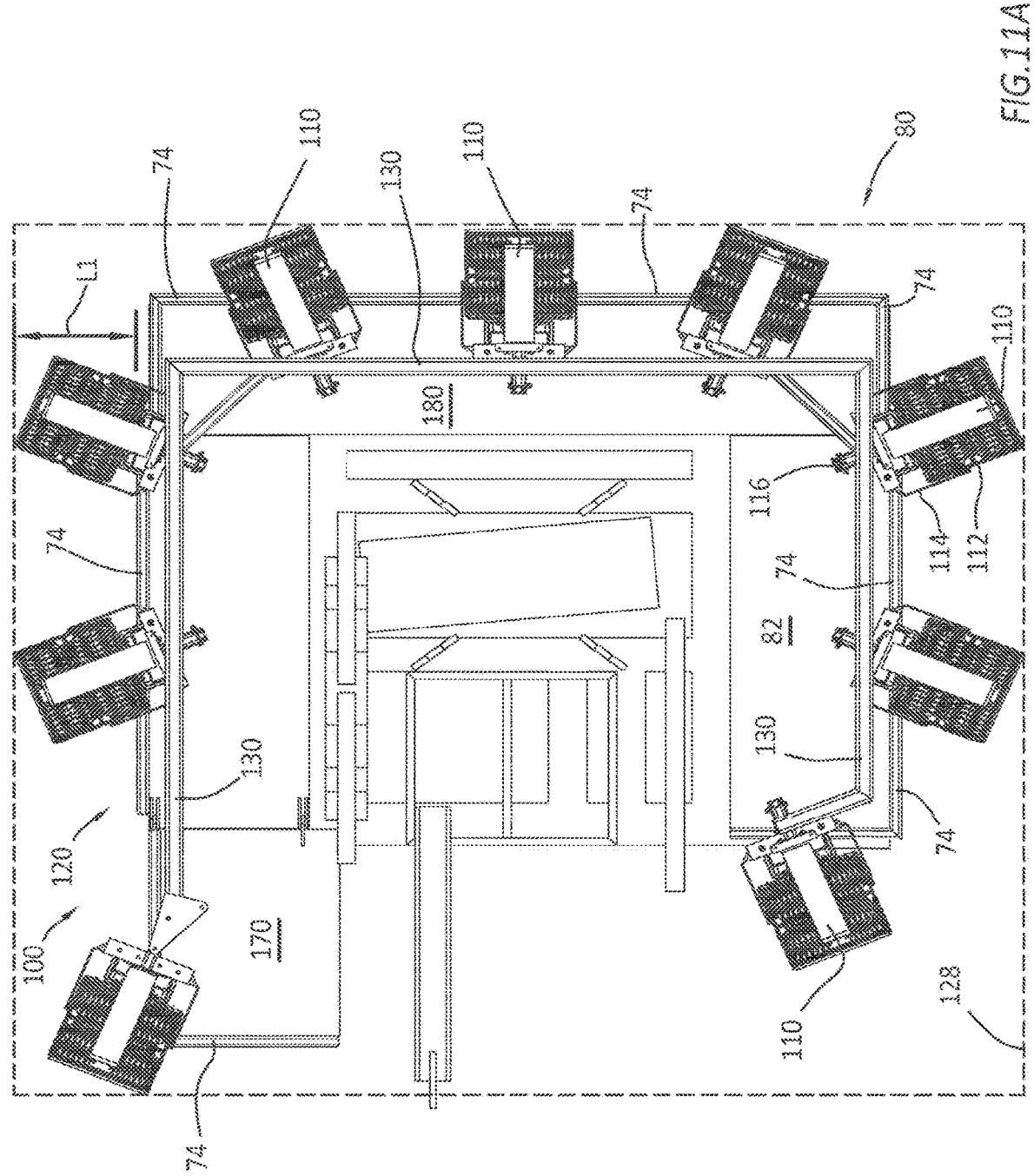
FIGS. 11A, 11B are representative top views of the CDL system of FIG. 9 on a crown deck in a deployed configuration (FIG. 11A) or in a stowed configuration (FIG. 11B), in accordance with certain embodiments.
Figure 11B:
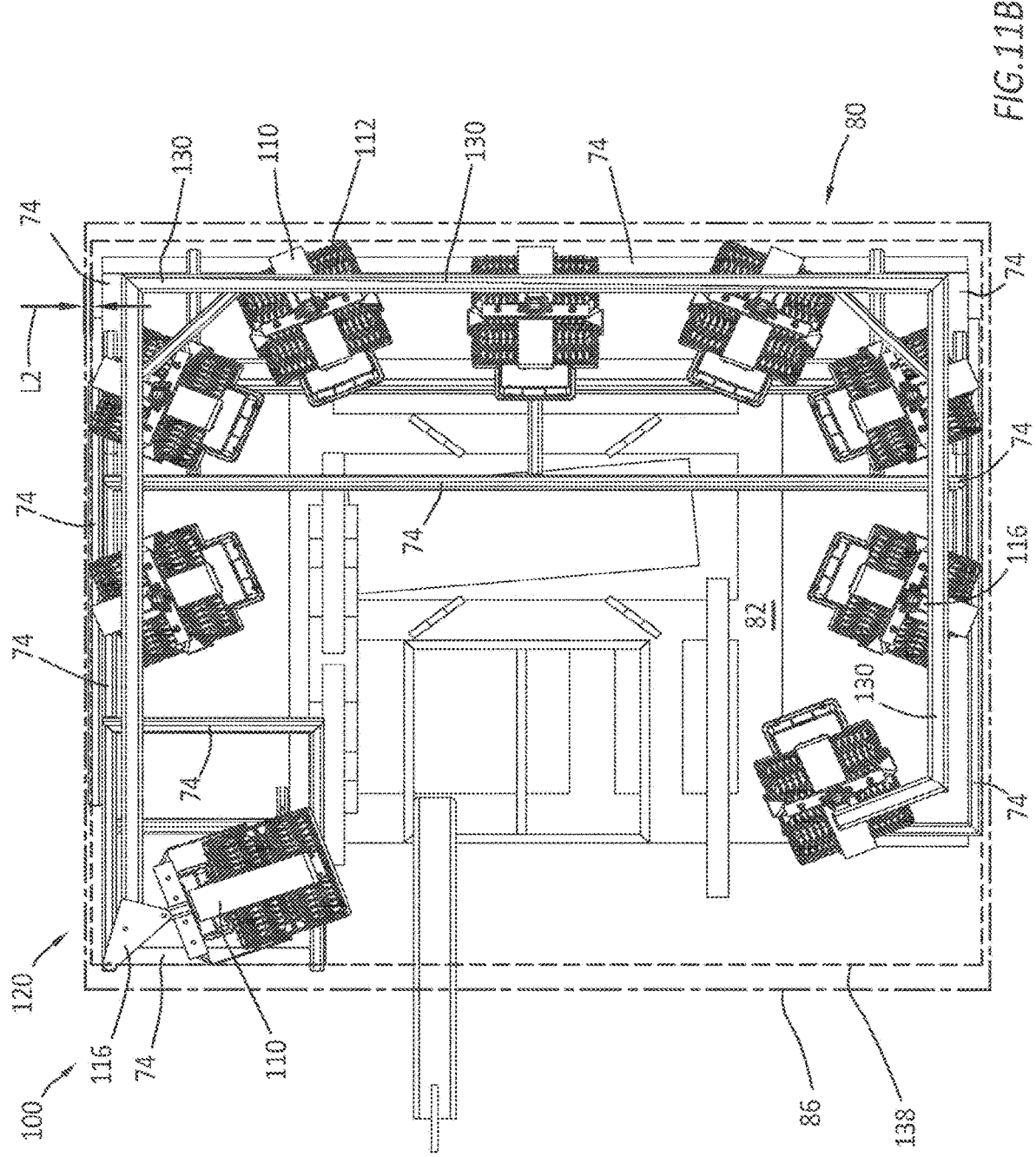
Figure 11C:
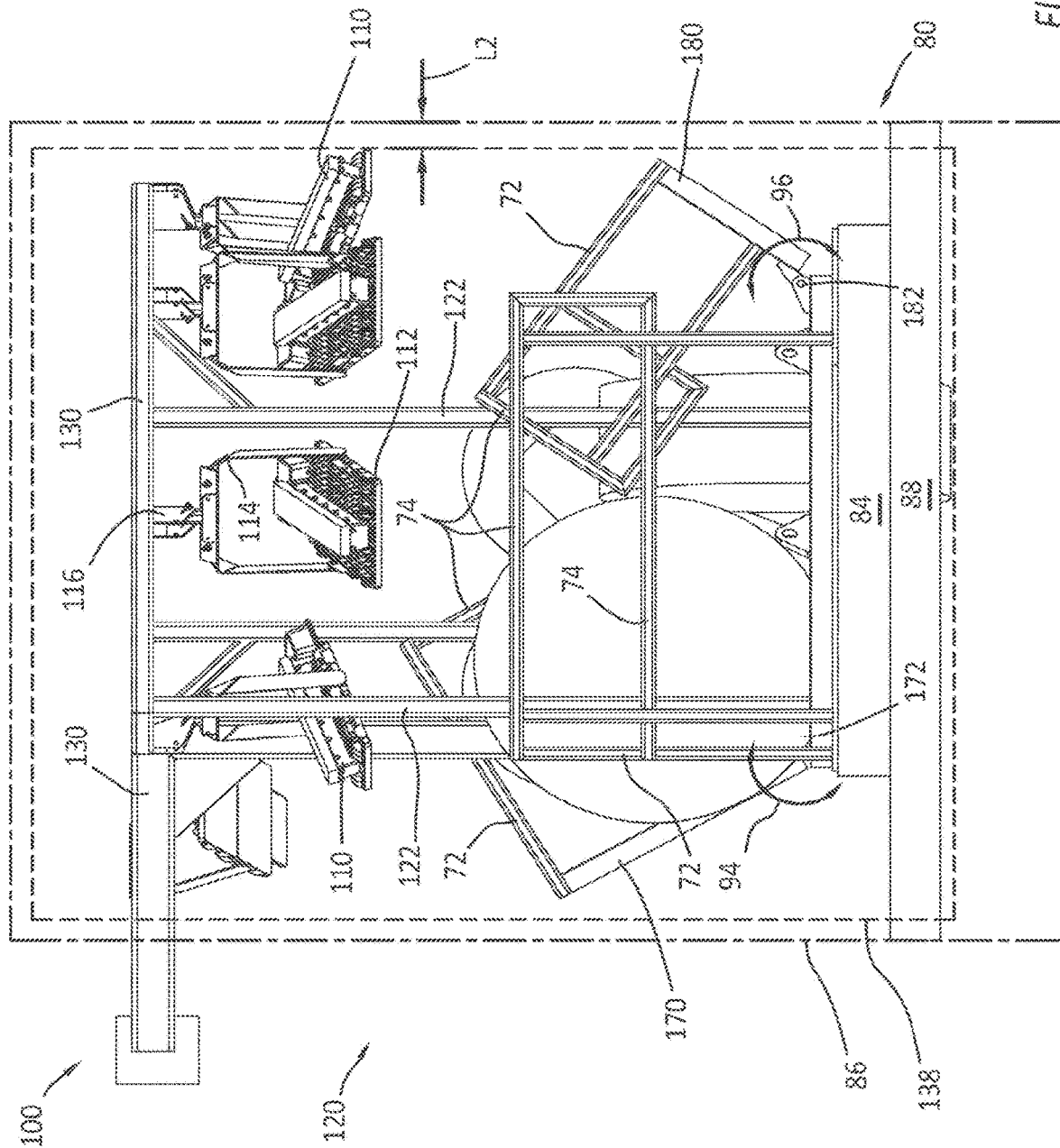
FIG. 11C is a representative side view of the CDL system of FIG. 11B with the CDL system and the crown deck being in a stowed configuration, in accordance with certain embodiments.

As used herein, a "stowed position" refers to a position of the light fixture assembly 110 that causes the light fixture assembly 110 to be radially positioned toward a center of the crown deck, and radially inside of a perimeter established by a handrail 70 when viewed as a top view of the crown deck 80 (e.g., FIGS. 4B, 8B) or radially inside a perimeter established by a shipping frame 88 (or transport structure; see FIG. 11C) which can be attached to the crown deck 80 for transportation to a new rig site 11 (e.g., FIG. 11C). As used herein, a "deployed position" refers to a position of the light fixture assembly 110 that causes the light fixture assembly 110 to be radially extended outside of the perimeter established by the handrail 70 when viewed as a top view of the crown deck 80 (e.g., FIGS. 4A, 8A, 11A).

As used herein, a "deployed configuration" refers to when the CDL system 100 and crown deck 80 are installed on a rig and are configured for supporting subterranean operations by moving the light fixture assemblies 110 and possibly portions 170, 180 of the crown deck 80 (see FIG. 11C) to a deployed position. As used herein, a "stowed configuration" refers to when the CDL system is configured to be transported by moving the light fixture assemblies 110 and possibly portions 170, 180 of the crown deck 80 (see FIG. 11C) to a stowed position.

The bracket 114 can be generally U-shaped with a generally flat portion 154 at the bottom of the U-shape. The flat portion 154 can be removably secured, such as via one or more fasteners 156, to a mounting plate 152 of a generally T-shaped support 140. The mounting plate 152 can be seen as the top of the T-shape of support 140, with a support 158 forming the leg of the T-shape of support 140. The support 158 can be rotationally coupled to the light fixture attachment 116 at the pivot 150, via a retainer 142. The retainer 142 is preferably a quick release fastener that allows for an individual 4 to remove and reinstall the retainer 142 as needed to adjust the light fixture assembly 110. The attachment 116 can include two or more retention features, such as pairs of openings 144, 146, 148 through parallel plates of the attachment 116. In FIG. 5A, the lighting fixture assembly 110 is rotated about the pivot 150 (arrows 92) to a stowed position, with a retainer 142 installed through the pair of openings 146 and through an opening in the support 158 to hold the lighting fixture assembly 110 in the stowed position.

The attachment 116 can be welded to the light fixture support 118, with the bottom surface 119 of the light fixture support 118 optionally welded to the horizontal support 130 (see FIG. 2). This provides structural support for the lighting fixture assembly 110. To move the lighting fixture assembly 110 from the deployed position shown in FIG. 5A to the deployed position shown in FIG. 5B, the retainer 142 can be removed from the pair of openings 146, which allows the support 158 to be rotated (and thereby the lighting fixture assembly 110) about the pivot 150 to one of the deployed positions. When the opening in the support 158 aligns with another pair of openings, such as the pair of openings 144, the retainer 142 can again be inserted into the openings 144 of the attachment 116 and the opening in the support 158 to secure the lighting fixture assembly 110 in the deployed position.

In certain other embodiments, the attachment 116 can be welded directly to a horizontal or vertical support without having a support 118 positioned in between them. However, the movement between stowed and deployed positions is still performed by rotating the bracket 114 to a desired position in the attachment 116 and inserting the retainer 142 through the openings in the bracket 114 and the attachment 116 to rotationally secure the bracket 114 within the attachment 116. The attachment 116 can be formed in various shapes as needed to accommodate various attachment positions.

If additional pairs of openings, such as openings 148, are also included in the attachment 116, then the lighting fixture assembly 110 can be deployed to one of multiple deployed positions. When the rig 10 is being moved to a new rig site 11, then the lighting fixture assembly 110 can be rotated and secured in a stowed position as shown in FIG. 5A. The crown deck 80 can then be removed from the rig 10 and transported to the new rig site 11. When the crown deck 80 is again installed on the rig 10, but at the new rig site 11, then the lighting fixture assembly 110 can be rotated to a desired deployed position by rotating the lighting fixture assembly 110 to the desired deployed position, and then inserting the retainer 142 through the desired pair of openings in the attachment 116 and the opening in the support 158 that will secure the lighting fixture assembly 110 in the desired deployed position.

Figure 6:
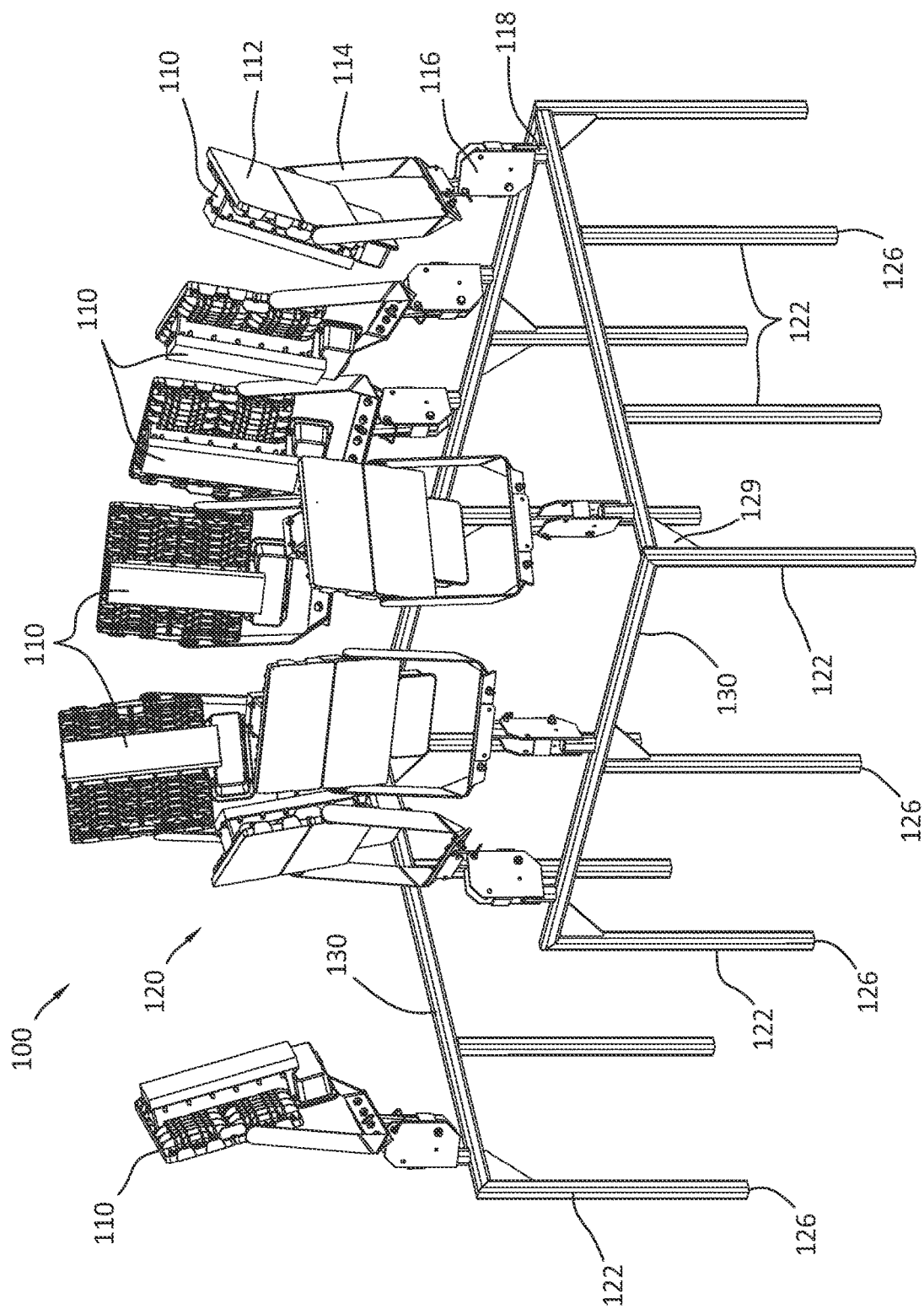
FIG. 6 is a representative perspective view of another CDL system configured for attachment to a crown deck, in accordance with certain embodiments.

FIG. 6 is a representative perspective view of another CDL system 100 configured for attachment to a crown deck 80. In this non-limiting embodiment, the CDL system 100 can include a support structure 120 with one or more horizontal supports 130 and multiple vertical supports 122 constructed as a single structure with the supports 122 and 130 integral to the support structure 120. One or more light fixture assemblies 110 can be mounted to the horizontal supports 130, via a light fixture support 118, which can be welded to the horizontal supports 130. Each light fixture assembly 110 can include a light 112 rotationally attached to a light fixture bracket 114 that can be generally U-shaped. However, it should be understood that other shapes can be used to provide the bracket 114 for the lighting fixture assembly 110.

The light fixture bracket 114 can be adjustably attached to a light fixture attachment 116, which can be welded to the support 118. The support 118 can be removably attached to the horizontal supports 130 via a clamp (not shown) so that the light fixture assembly 110 can be moved along one of the horizontal supports 130, to position the light fixture assembly 110 at various positions on the one of the horizontal supports 130. However, it is preferred to weld the support 118 to one of the horizontal supports 130 and weld the attachment 116 to the support 118. Each of the vertical supports 122 can include a bottom surface 126 that is welded to the crown deck top surface 82, thereby securing the vertical supports 122 to the crown deck 80. It should be understood that the vertical supports 122 can include a bottom surface 126 that is welded to the derrick 14 instead of the crown deck 80 or a combination of both, thereby securing the vertical supports 122 to the rig 10.

The support structure 120 (and possibly the CDL system 100) can be assembled as a single unit and installed on the crown deck top surface 82 as a single unit. Alternatively, the support structure 120, including the light fixture supports 118, can be assembled as a single unit and installed on the crown deck top surface 82 as a single unit, with the light fixture attachment 116 and the light fixture assemblies 110 added after the support structure 120 is welded to the top surface 82 of the crown deck 80. Alternatively, the support structure 120, including the light fixture supports 118 and the light fixture attachments 116, can be assembled as a single unit and installed on the crown deck top surface 82 as a single unit, with the light fixture assemblies 110 added after the support structure 120 is welded to the top surface 82 of the crown deck 80. Alternatively, the CDL system 100 can be installed on the top surface 82 of the crown deck 80 by separately attaching individual pieces or sub-assemblies of pieces together to form the CDL system 100 (i.e., build the CDL system 100 in place on the crown deck 80).

The support structure 120 can include the vertical and horizontal supports 122, 130, optional gussets 129, the light fixture supports 118, and the light fixture attachments 116. Each light fixture assembly 110 can include a U-shaped light fixture bracket 114, to which is mounted a light 112. The light 112 can be selectively rotated relative to the bracket 114 (e.g., when attachment fasteners are loosened), and can be selectively rotationally fixed to the bracket 114 (e.g., when attachment fasteners are tightened).

Figure 7:
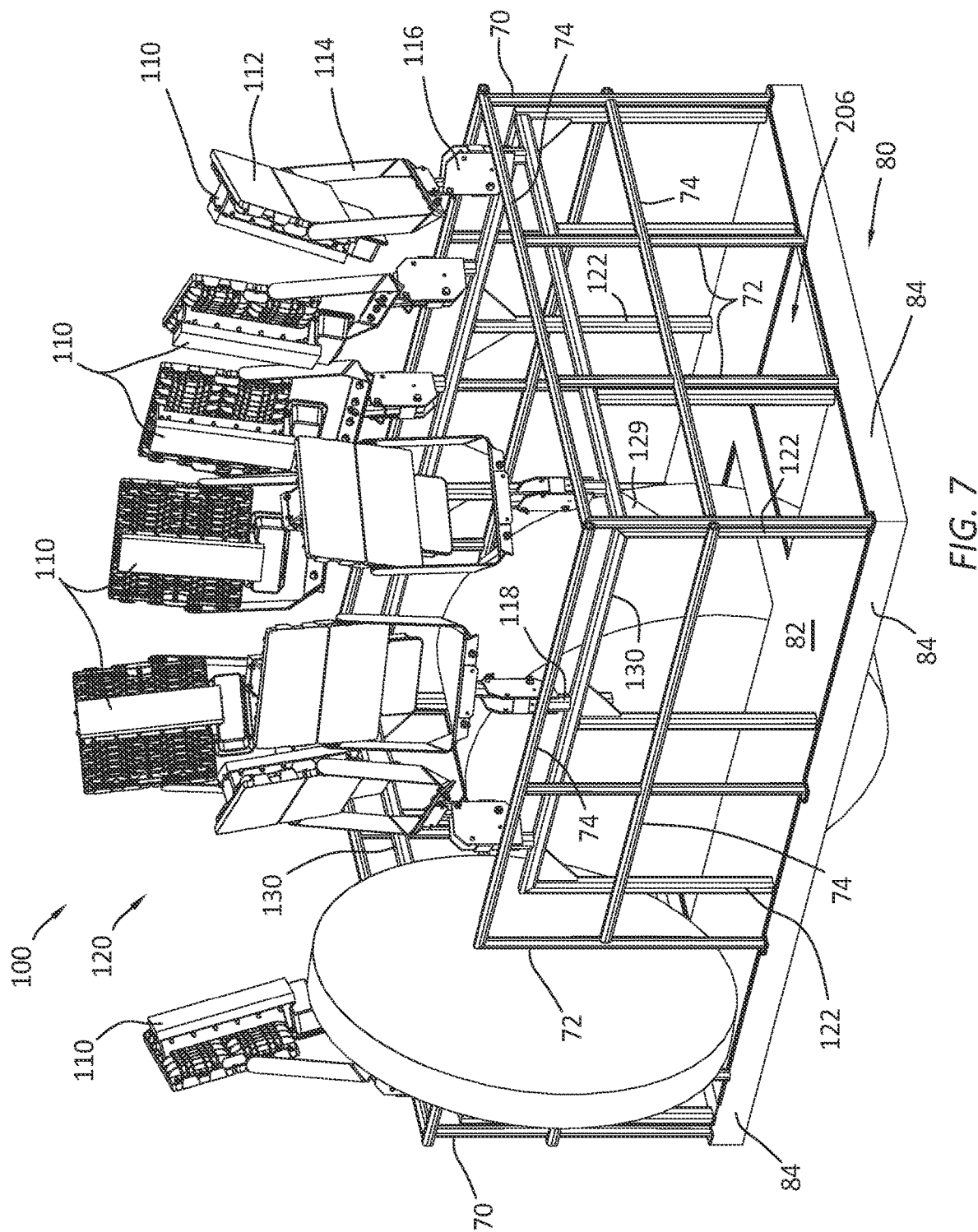
FIG. 7 is a representative perspective view of the CDL system of FIG. 6 installed on a crown deck, in accordance with certain embodiments.

FIG. 7 is a representative perspective view of the CDL system of FIG. 6 installed on the crown deck 80. The crown deck 80 can include four sides 84 and a handrail 70 that can extend around a major portion of the perimeter of the crown deck 80. The handrail 70 can include vertical supports 72, horizontal supports 74, and a kick plate 76 (not shown). The CDL system 100 is shown installed on the top surface 82 of the crown deck 80. The CDL system 100 is installed on the top surface of the crown deck 82 just inside the handrail 70 and does not contact the handrail 70 (i.e., is spaced away from the handrail 70). The horizontal supports 130 can be disposed at a lower vertical elevation than the top horizontal supports 74 of the handrail 70, yet it is not required that the horizontal supports 130 be disposed at a lower vertical elevation than the top horizontal supports 74 of the handrail 70. The light fixture assemblies 110 can extend from the horizontal supports 130 to position the lights 112 above the top horizontal supports 74. The lights 112 can be leaned out over the top horizontal supports 74 and generally directed in a downward angle toward at least a portion of the rig site 11.

In this non-limiting embodiment, the CDL system 100 is formed around the crown deck 80, which encompasses an opening 206 in the crown deck 80 through which an individual 4 can pass through when moving between the crown deck 80 and a ladder leading up to the crown deck 80. The horizontal supports 130 are held at a vertical elevation above the crown deck top surface 82 by one or more vertical supports 122. However, it should be understood that various other configurations of vertical and horizontal supports can be used in assembling the CDL system 100 on a crown deck top surface 82 in keeping with the principles of this disclosure. Please note, the vertical and horizontal supports of the CDL system 100 are spaced away from the handrail 70. The CDL system 100 is mounted inside the handrail 70, when a handrail 70 is included on the crown deck 80. The horizontal and vertical supports 122, 130 can be used to route conductors, for power and control, to the lights 112. By running conductors in the supports, this can reduce trip hazards on the crown deck 80, especially in a traffic area such as surrounding the opening 206.

Figure 8A:
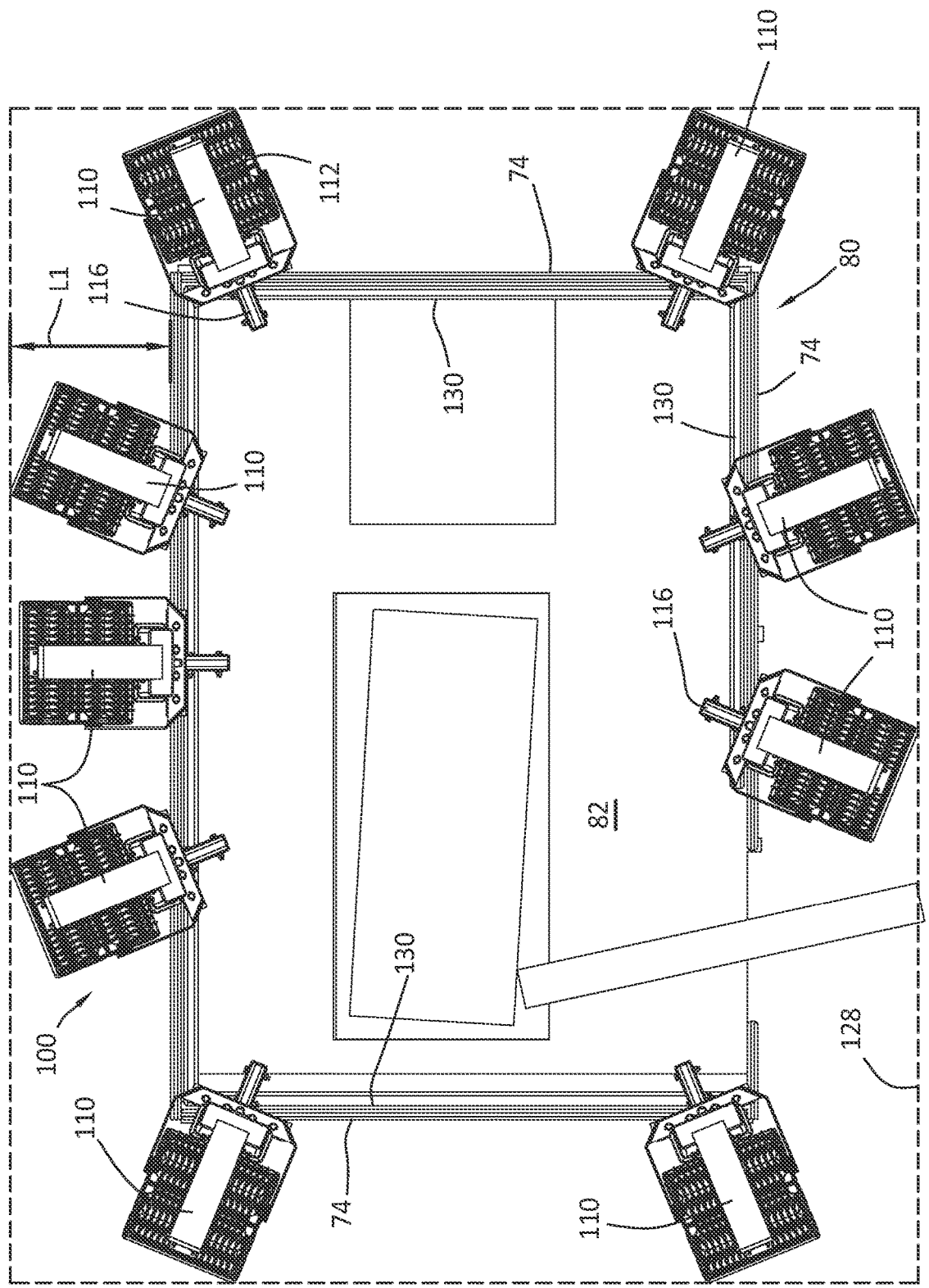
FIGS. 8A, 8B are representative top views of the CDL system of FIG. 6 on a crown deck in a deployed configuration (FIG. 8A) or in a stowed configuration (FIG. 8B), in accordance with certain embodiments.

FIG. 8A is a representative top view of the CDL system 100 of FIG. 6 on a crown deck 80 in a deployed configuration. In this non-limiting embodiment, the CDL system 100 is in a deployed configuration (i.e., the lights 112 in a deployed position), and the lights 112 can form an outer perimeter 128 that is larger than the perimeter formed by the handrail 70. The length L1 can represent the maximum distance that the lights 112 radially extend past the handrail 70. Each light 112 is not required to extend radially outward by the maximum length L1. This merely represents the maximum length L1 of the lights 112 that are extended radially outward. The rest of the lights 112 can be radially extended at or below the maximum length L1.

Figure 8B:
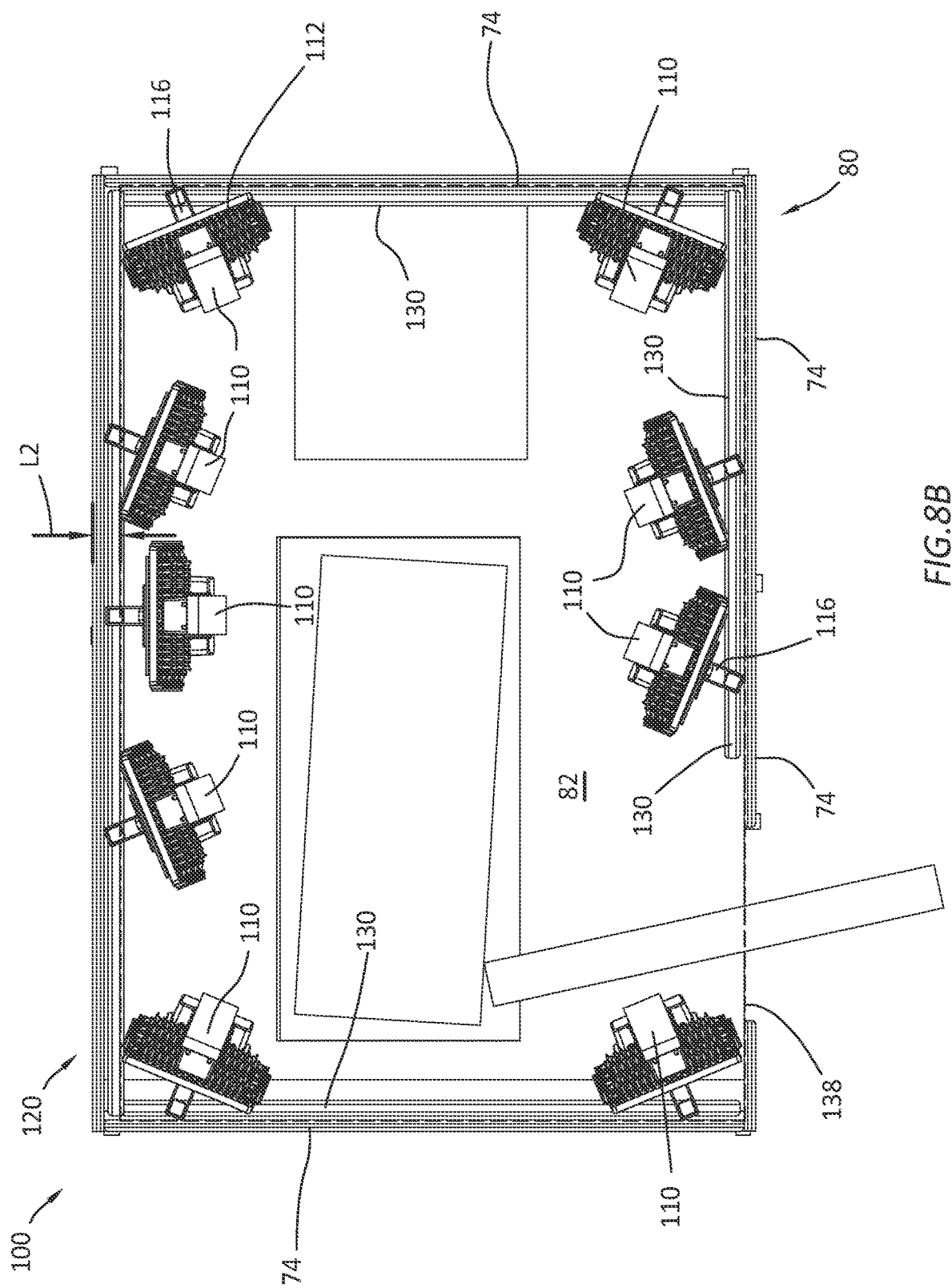

FIG. 8B is a representative top view of the CDL system 100 of FIG. 6 on a crown deck 80 in a stowed configuration. With each of the lights 112 in a stowed position, they can form an outer perimeter 138 that is smaller than the perimeter formed by the handrail 70. The length L2 can represent the minimum distance that the lights 112 radially inward from an outer perimeter formed by the handrail 70. Each light 112 can extend at or above the minimum length L2 from an outer perimeter formed by the handrail 70. The stowed position is used to protect the lights 112 when the crown deck 80 is removed from the rig 10 and transported to another rig site 11 to be assembled onto another rig 10 at the new rig site 11.

By stowing the lights 112 in the stowed position, the crown deck 80 can be removed and transported to a new rig site 11 and installed on a rig at the new rig site 11 without removing the lights 112 or the support structure 120. It is preferred that L2 be greater than or equal to "0" zero. Damage may occur if the lights extend outward from the handrail 70 (or, as in other embodiments, a shipping frame or transport structure) during transport to another rig site 11.

Figure 9:
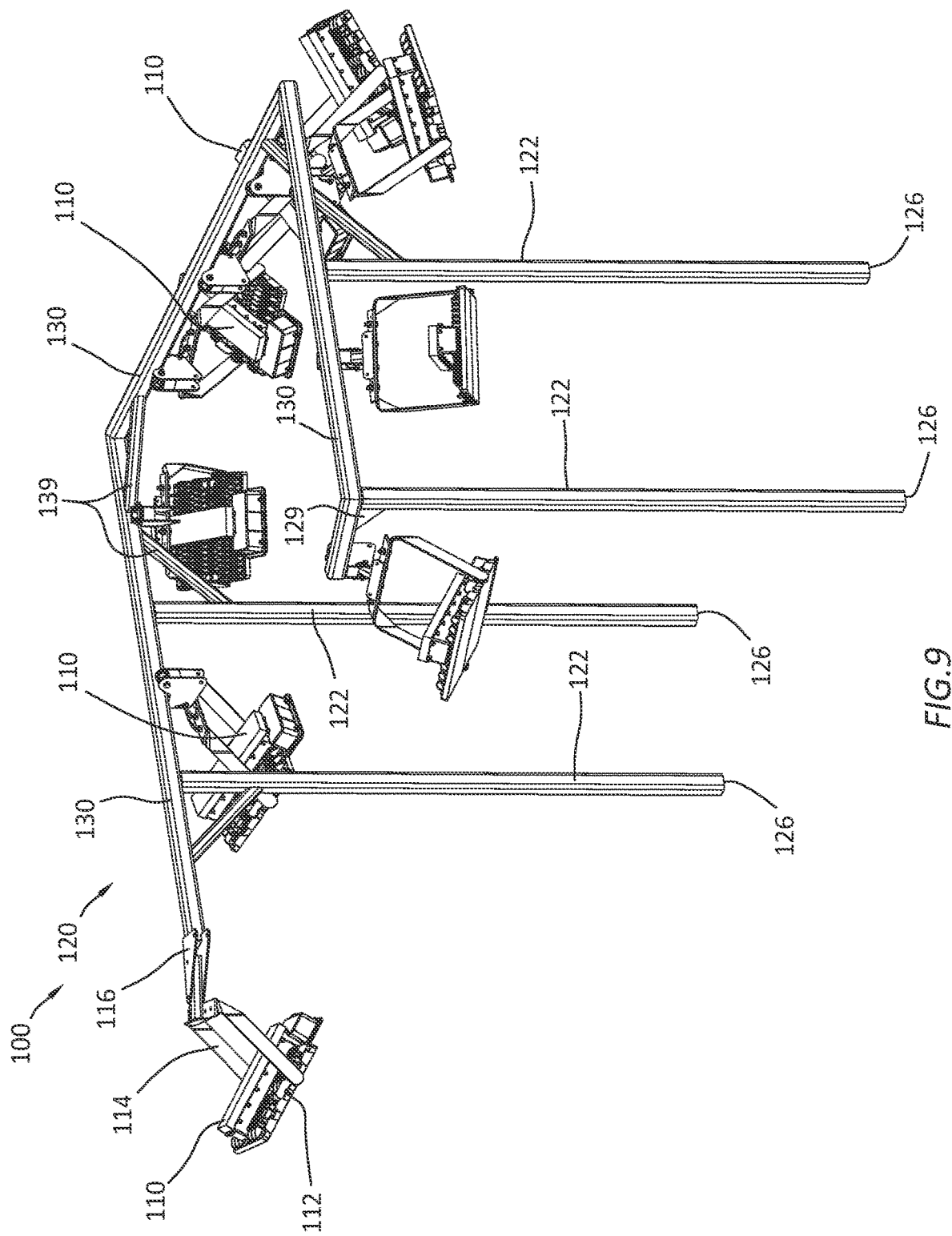
FIG. 9 is a representative perspective view of another CDL system configured for attachment to a crown deck, in accordance with certain embodiments.

FIG. 9 is a representative perspective view of another CDL system 100 configured for attachment to a crown deck 80. In this non-limiting embodiment, the CDL system 100 can include a support structure 120 with one or more horizontal supports 130 and multiple vertical supports 122 constructed as a single structure with the supports 122 and 130 integral to the support structure 120. One or more light fixture assemblies 110 can be mounted to the horizontal supports 130, via a light fixture attachment 116, which can be welded to the horizontal supports 130. Please note that this embodiment does not use a light fixture support 118 for attachment of the light fixture attachment 116 to the horizontal supports 130. Each light fixture assembly 110 can include a light 112 rotationally attached to a light fixture bracket 114 that can be generally U-shaped. However, it should be understood that other shapes can be used to provide the bracket 114 for the lighting fixture assembly 110.

The light fixture bracket 114 can be adjustably attached to a light fixture attachment 116, which can be welded to the horizontal supports 130. The attachment 116 can be removably attached to the horizontal supports 130 via a clamp (not shown) so that the light fixture assembly 110 can be moved along one of the horizontal supports 130, to position the light fixture assembly 110 at various positions on the one of the horizontal supports 130. However, it is preferred to weld the attachment 116 to one of the horizontal supports 130. Even though this is not shown in this embodiment, some embodiments may have the attachment 116 welded to a side of one of the vertical supports 122. This can be an option when the vertical supports 122 extend above the handrail 70, as in this non-limiting embodiment. Each of the vertical supports 122 can include a bottom surface 126 that is welded to the crown deck top surface 82, thereby securing the vertical supports 122 to the crown deck 80. It should be understood that the vertical supports 122 can include a bottom surface 126 that is welded to the derrick 14 instead of the crown deck 80 or a combination of both, thereby securing the vertical supports 122 to the rig 10.

The support structure 120 (and possibly the CDL system 100) can be assembled as a single unit and installed on the crown deck top surface 82 as a single unit. Alternatively, the support structure 120, including the light fixture attachments 116, can be assembled as a single unit and installed on the crown deck top surface 82 as a single unit, with the light fixture assemblies 110 added after the support structure 120 is welded to the top surface 82 of the crown deck 80. Alternatively, the CDL system 100 can be installed on the top surface 82 of the crown deck 80 by separately attaching individual pieces or sub-assemblies of pieces together to form the CDL system 100 (i.e., build the CDL system 100 in place on the crown deck 80).

The support structure 120 can include the vertical and horizontal supports 122, 130, optional gussets 129, 139 and the light fixture attachments 116. Each light fixture assembly 110 can include a U-shaped light fixture bracket 114, to which can be mounted a light 112. The light 112 can be selectively rotated relative to the bracket 114 (e.g., when attachment fasteners are loosened), and can be selectively rotationally fixed to the bracket 114 (e.g., when attachment fasteners are tightened).

Figure 10:
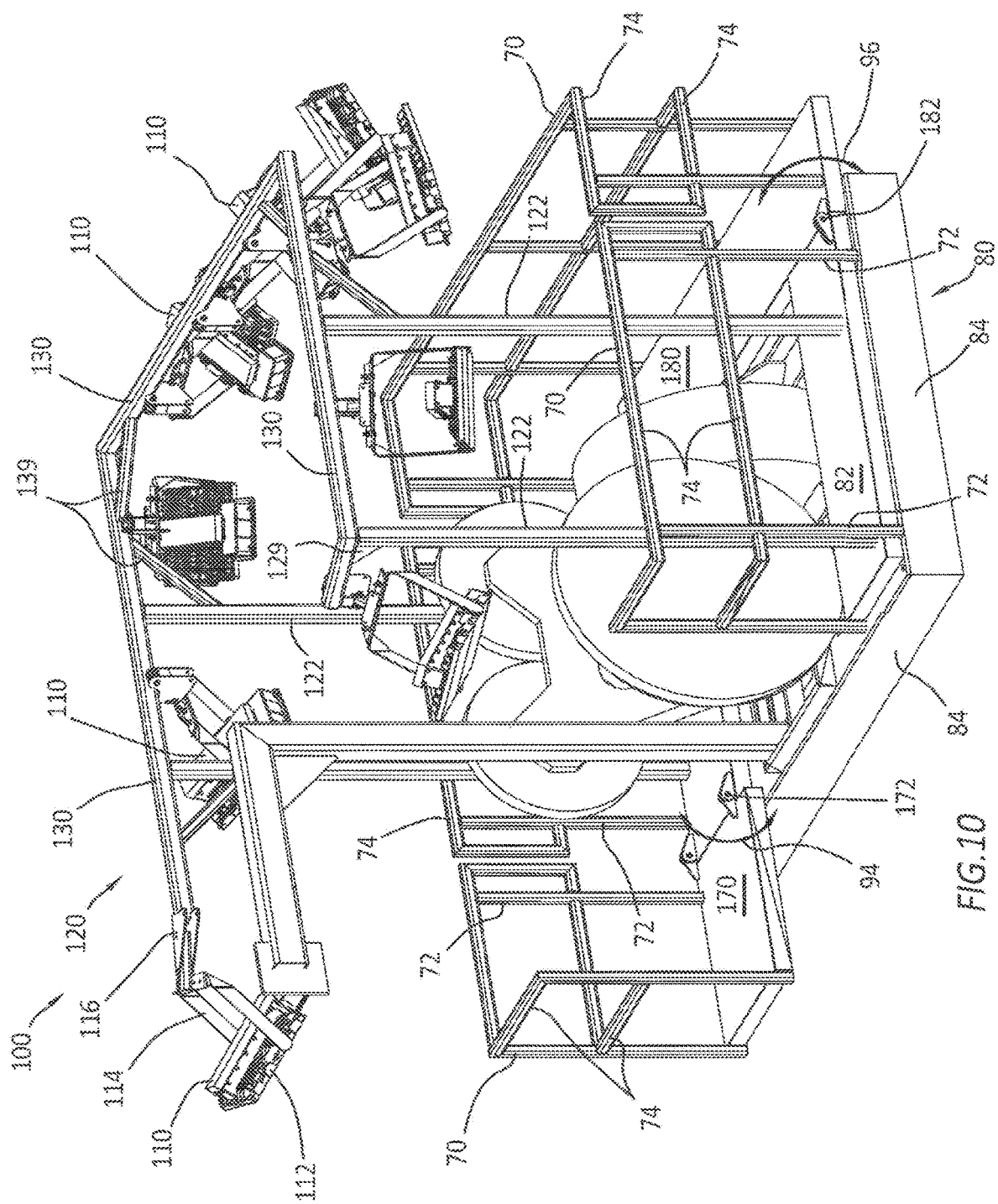
FIG. 10 is a representative perspective view of the CDL system of FIG. 9 installed on a crown deck, in accordance with certain embodiments.

FIG. 10 is a representative perspective view of the CDL system of FIG. 9 installed on the crown deck 80. The crown deck 80 can include four sides 84 and a handrail 70 that can extend around a major portion of the perimeter of the crown deck 80. The handrail 70 can include vertical supports 72, horizontal supports 74, and a kick plate 76 (not shown). The CDL system 100 is shown installed on the top surface 82 of the crown deck 80. The CDL system 100 is installed on the top surface of the crown deck 82 just inside the handrail 70 and does not contact the handrail 70 (i.e., is spaced away from the handrail 70). The horizontal supports 130 can be disposed at a higher vertical elevation than the top horizontal supports 74 of the handrail 70, yet it is not required that the horizontal supports 130 be disposed at a higher vertical elevation than the top horizontal supports 74 of the handrail 70. The light fixture assemblies 110 can extend from the horizontal supports 130 to position the lights 112 above the top horizontal supports 74. The lights 112 can be extended out radially past the top horizontal supports 74 and generally directed in a downward angle toward at least a portion of the rig site 11.

The light fixture attachments 116 can be mounted to the underside or another one of the sides of the horizontal supports 130, instead of on the top side of the horizontal supports 130, as shown in FIGS. 2-4 and 6-9, and extend downward toward the crown deck 80 or radially outward away from the horizontal support 130. As seen in FIG. 11, at least one of the light fixture attachments 116 can be attached to an end of a horizontal support 130, with the bracket 114 extending horizontally from the end of the horizontal support 130. Also, the light fixture assembly 110 can be rotated in a horizontal direction (or any angle in between horizontal and vertical depending upon the azimuthal orientation of the light fixture attachment 116). Each of the light fixture assemblies 110 can be rotated between a stowed position and one or more deployed positions, such as similarly described with reference to FIGS. 5A and 5B.

In this non-limiting embodiment, the CDL system 100 is formed around the crown deck 80 and allows up to an 80-degree upward rotation of opposite portions 170, 180 of the crown deck 80 (arrows 94, 96, respectively) about pivots 172, 182, respectively. The horizontal supports 130 are held at a vertical elevation above the crown deck top surface 82 by one or more vertical supports 122. However, it should be understood that various other configurations of vertical and horizontal supports can be used in assembling the CDL system 100 on a crown deck top surface 82 in keeping with the principles of this disclosure. Please note, the vertical and horizontal supports of the CDL system 100 are spaced away from the handrail 70. The CDL system 100 is mounted inside the handrail 70, when a handrail 70 is included on the crown deck 80. The horizontal and vertical supports 122, 130 can be used to route conductors, for power and control, to the lights 112. By running conductors in the supports, this can reduce trip hazards on the crown deck 80 and protect the conductors during relocation activities.

FIG. 11A is a representative top view of the CDL system 100 of FIG. 9 on a crown deck 80 in a deployed configuration. In this non-limiting embodiment, the CDL system 100 and the crown deck 80 are in a deployed configuration (i.e., the lights 112 in a deployed position and portions 170, 180 of the crown deck 80 in a deployed position), and the lights 112 can form an outer perimeter 128 that is larger than the perimeter formed by the handrail 70. The length L1 can represent the maximum distance that the lights 112 radially extend past the handrail 70. Each light 112 is not required to extend radially outward by the maximum length L1. This merely represents the maximum length L1 of the lights 112 that are extended radially outward. The rest of the lights 112 can be radially extended at or below the maximum length L1.

FIG. 11B is a representative top view of the CDL system of FIG. 9 on a crown deck in a stowed configuration. With the CDL system 100 in a stowed configuration (i.e., each of the lights 112 in a stowed position), the lights 112 can form an outer perimeter 138 that is smaller than the perimeter formed by the handrail 70. The length L2 can represent the minimum distance that the lights 112 radially inward from an outer perimeter formed by the handrail 70. Each light 112 can extend at or above the minimum length L2 from an outer perimeter formed by the handrail 70. The stowed position is used to protect the lights 112 when the crown deck 80 is removed from the rig 10 and transported to another rig site 11 to be assembled onto another rig 10 at the new rig site 11.

The lights 112 are shown in a stowed position that forms an outer perimeter 138 which is smaller than the perimeter 86 formed by a shipping frame 88 (see FIG. 11C), which can include any kind of shipping stand-off structure, pallets, shipping truck modifications, etc. The shipping frame 88 can be used to transport the crown deck 80. The shipping frame 88 can be removed from the crown deck 80 when the crown deck 80 is to be installed on the rig 10 and then reattached when the crown deck 80 is to be moved. By stowing the lights 112 in the stowed position, the crown deck 80 can be removed and transported to a new rig site 11 and installed on a rig at the new rig site 11 without removing the lights 112 or the support structure 120. The length L2 can represent a minimum distance that the lights 112 radially extend inward from the outer perimeter 86 formed by the shipping frame 88. Each light 112 is not required to extend inward by the minimum length L2, since some of the lights 112 can extend further inward than the one or more at the minimum length L2. It is preferred that L2 is greater than or equal to "0" zero. Damage may occur if the lights extend radially outward from the perimeter 86 during transport to another rig site 11.

FIG. 11C is a representative side view of the CDL system of FIG. 11B with the CDL system and the crown deck being in a stowed configuration. The portions 170 and 180 of the crown deck 80 are shown rotated about pivots 172, 182, respectively (arrows 94, 96, respectively) to a stowed position (e.g., rotated up to an angle, e.g., 45-degrees, relative to the crown deck top surface 82). The crown deck portion 170 contains horizontal supports 74 and vertical supports 72 that are fixed to the portion 170 and rotate with the portion 170. The portion 170 is shown rotated about the pivot 172 (arrows 94) in a clockwise direction to the stowed position. The horizontal supports 74 and vertical supports 72 of the portion 170 are positioned offset from the horizontal supports 74 and vertical supports 72 that are fixedly attached to the top surface 82 of the crown deck 80. This offset allows the horizontal supports 74 and vertical supports 72 positioned on the ends of the portion 170 (i.e., ends that are perpendicular to the pivot 172) to rotate beside the horizontal supports 74 and vertical supports 72 on the middle portion to allow rotation of the portion 170 between deployed and stowed positions.

The crown deck portion 180 contains horizontal supports 74 and vertical supports 72 that are fixed to the portion 180 and rotate with the portion 180. The portion 180 is shown rotated about the pivot 182 (arrows 96) in a counterclockwise direction to the stowed position. The horizontal supports 74 and vertical supports 72 of the portion 180 are positioned offset from the horizontal supports 74 and vertical supports 72 that are fixedly attached to the top surface 82 of the crown deck 80. This offset allows the horizontal supports 74 and vertical supports 72 positioned on the ends of the portion 180 (i.e., ends that are perpendicular to the pivot 182) to rotate beside the horizontal supports 74 and vertical supports 72 on the middle portion to allow rotation of the portion 180 between deployed and stowed positions.

The perimeter 86 can be formed by the shipping frame 88 that can be removably attached to the bottom of the crown deck 80 for transporting to another rig site 11. The perimeter 138 can be formed by the maximum radial position of the lights 112 in their stowed positions, or by any other structure of the support structure 120 that extends radially past one or more of the lights when they are stowed. For example, the light fixture attachment 116 in the top left corner of the support structure 120, as shown in FIG. 11B, is radially extended away from the horizontal support 130 by a distance that is farther than the radially extended light 112 that is attached to the light fixture attachment 116. The minimum distance L2 indicates the distance the shipping frame 88 radially extends past the lights 112 in their stowed positions. Each light 112 can extend at or above the minimum length L2 from an outer perimeter 86 formed by the shipping frame 88. The stowed position is used to protect the lights 112 when the crown deck 80 is removed from the rig 10 and transported to another rig site 11 to be assembled onto another rig 10 at the new rig site 11.

Figure 12A:
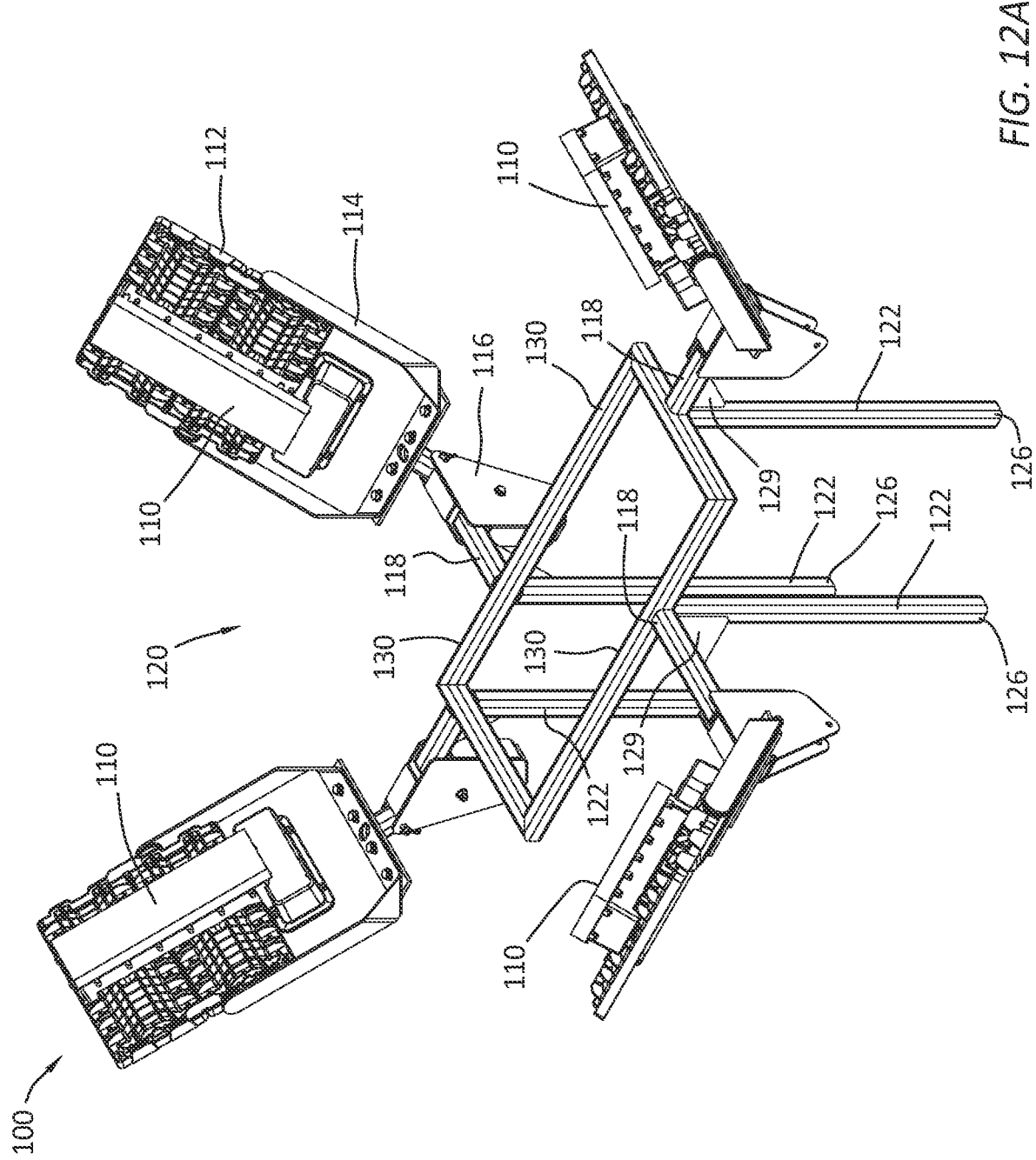
FIG. 12A is a representative perspective view of another CDL system configured for attachment to another crown deck, in accordance with certain embodiments.

FIG. 12A is a representative perspective view of another CDL system 100 configured for attachment to another crown deck 80. In this non-limiting embodiment, the CDL system 100 can include a support structure 120 with one or more horizontal supports 130 and multiple vertical supports 122 constructed as a single structure with the supports 122 and 130 integral to the support structure 120. One or more light fixture assemblies 110 can be mounted to the horizontal supports 130, via a light fixture support 118, which can be welded to the horizontal supports 130. Each light fixture assembly 110 can include a light 112 rotationally attached to a light fixture bracket 114 that can be generally U-shaped. However, it should be understood that other shapes can be used to provide the bracket 114 for the lighting fixture assembly 110.

The light fixture bracket 114 can be adjustably attached to a light fixture attachment 116, which can be welded to the support 118. The support 118 can be removably attached to the horizontal supports 130 via a clamp (not shown) so that the light fixture assembly 110 can be moved along one of the horizontal supports 130, to position the light fixture assembly 110 at various positions on the one of the horizontal supports 130. However, it is preferred to weld the support 118 to one of the horizontal supports 130 and weld the attachment 116 to the support 118. Each of the vertical supports 122 can include a bottom surface 126 that is welded to the crown deck top surface 82, thereby securing the vertical supports 122 to the crown deck 80. It should be understood that the vertical supports 122 can include a bottom surface 126 that is welded to the derrick 14 instead of the crown deck 80 or a combination of both, thereby securing the vertical supports 122 to the rig 10.

The support structure 120 (and possibly the CDL system 100) can be assembled as a single unit and installed on the crown deck top surface 82 as a single unit. Alternatively, the support structure 120, including the light fixture supports 118, can be assembled as a single unit and installed on the crown deck top surface 82 as a single unit, with the light fixture attachment 116 and the light fixture assemblies 110 added after the support structure 120 is welded to the top surface 82 of the crown deck 80. Alternatively, the support structure 120, including the light fixture supports 118 and the light fixture attachments 116, can be assembled as a single unit and installed on the crown deck top surface 82 as a single unit, with the light fixture assemblies 110 added after the support structure 120 is welded to the top surface 82 of the crown deck 80. Alternatively, the CDL system 100 can be installed on the top surface 82 of the crown deck 80 by separately attaching individual pieces or sub-assemblies of pieces together to form the CDL system 100 (i.e., build the CDL system 100 in place on the crown deck 80).

The support structure 120 can include the vertical and horizontal supports 122, 130, optional gussets 129, the light fixture supports 118, and the light fixture attachments 116. Each light fixture assembly 110 can include a U-shaped light fixture bracket 114, to which is mounted a light 112. The light 112 can be selectively rotated relative to the bracket 114 (e.g., when attachment fasteners are loosened), and can be selectively rotationally fixed to the bracket 114 (e.g., when attachment fasteners are tightened).

Figure 12B:
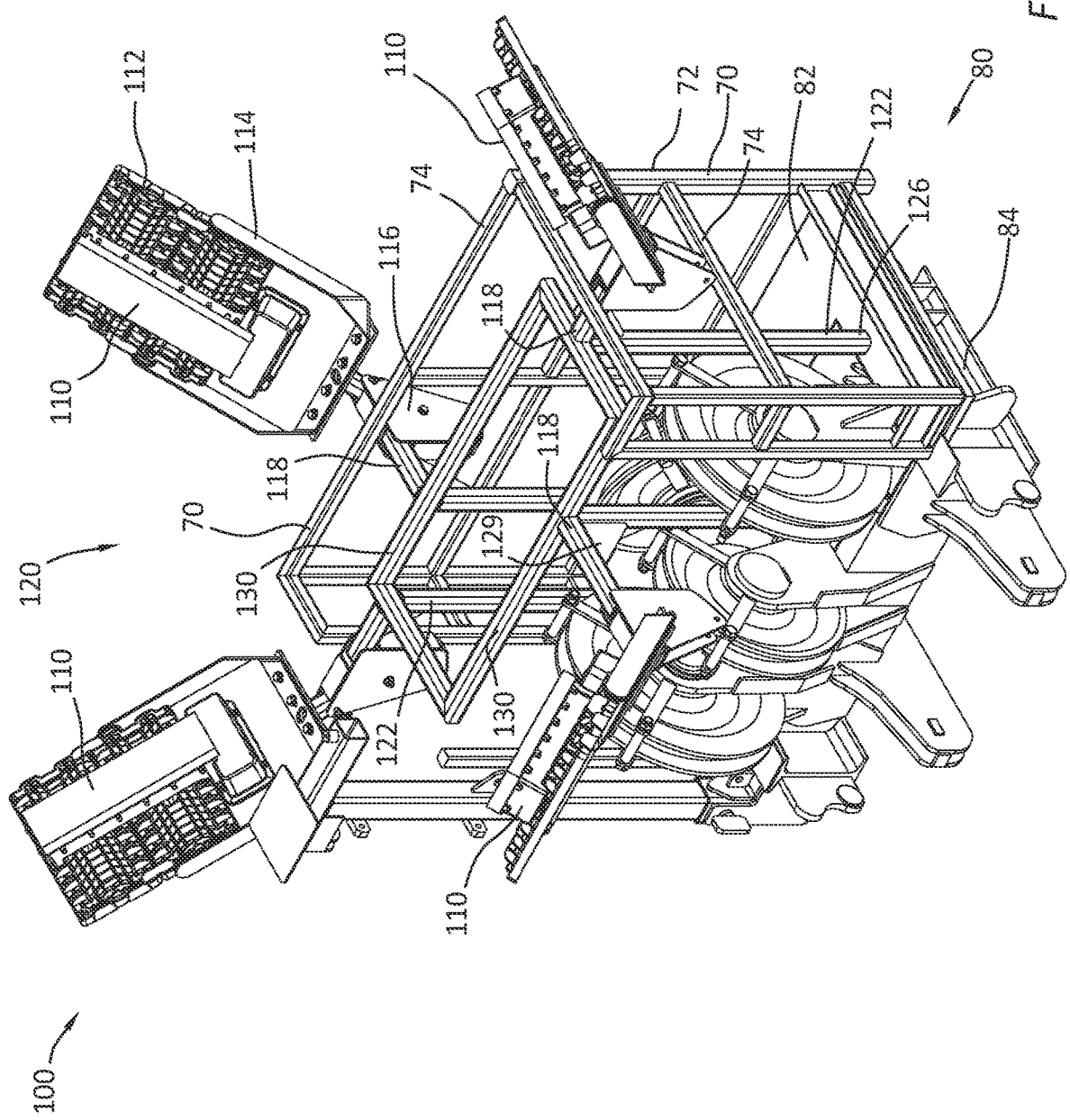
FIGS. 12B, 12C are representative top views of the CDL system of FIG. 12A on a crown deck in a deployed configuration (FIG. 12B) or in a stowed configuration (FIG. 12C), in accordance with certain embodiments.
Figure 12C:
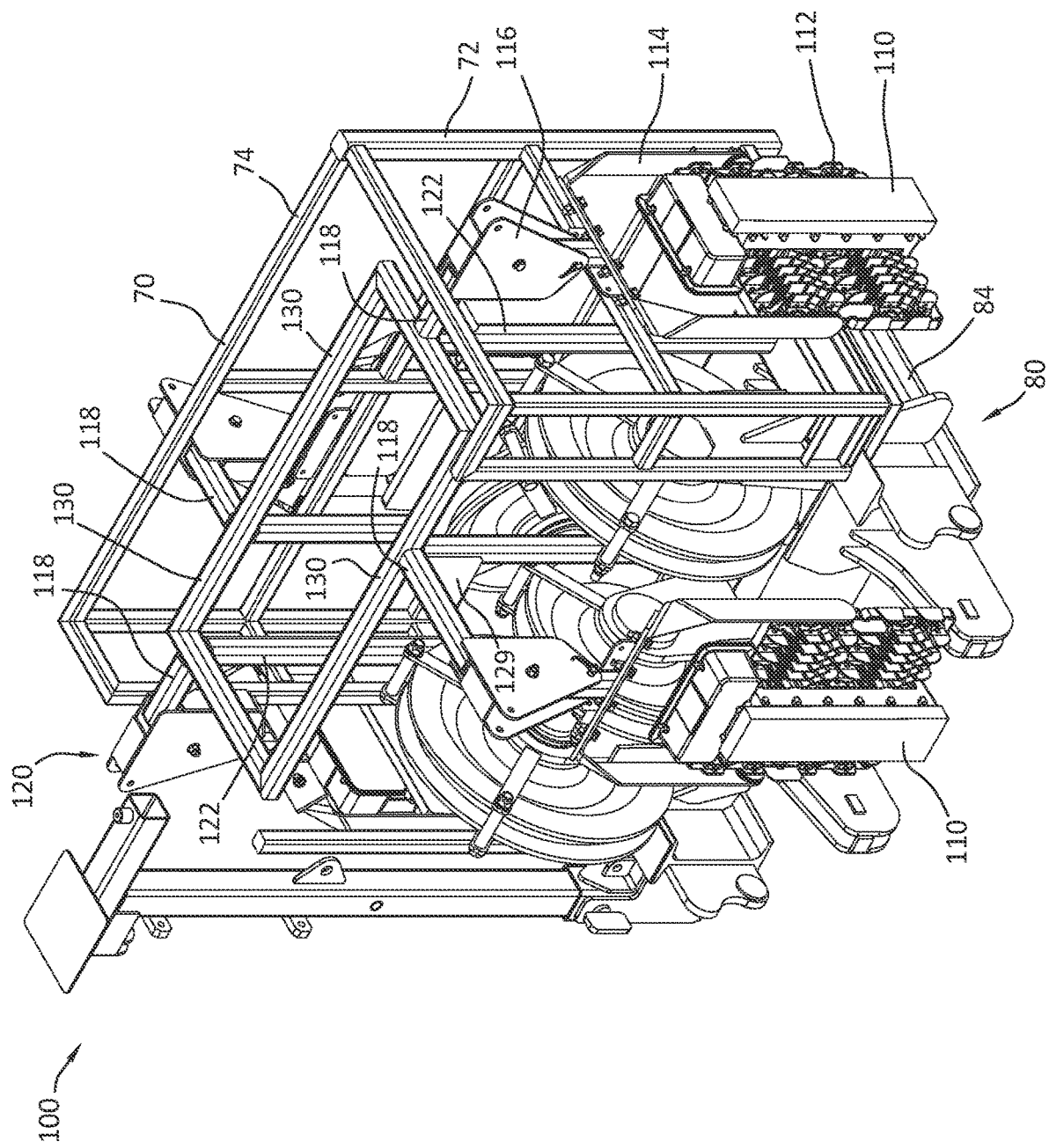

FIGS. 12B, 12C are representative top views of the CDL system of FIG. 12A on a crown deck in a deployed configuration (FIG. 12B) or in a stowed configuration (FIG. 12C), in accordance with certain embodiments.

FIG. 12B is a representative top view of the CDL system 100 of FIG. 12A on a crown deck 80 in a deployed configuration. In this non-limiting embodiment, the CDL system 100 is in a deployed configuration (i.e., the lights 112 in a deployed position), and the lights 112 can form an outer perimeter 128 that is larger than the perimeter formed by the handrail 70.

FIG. 12C is a representative top view of the CDL system 100 of FIG. 12A on a crown deck 80 in a stowed configuration. With each of the lights 112 in a stowed position, they can form an outer perimeter 138 that is larger than the perimeter formed by the handrail 70. The stowed position can be used to protect the lights 112 when the crown deck 80 is removed from the rig 10 and transported to another rig site 11 to be assembled onto another rig 10 at the new rig site 11. In this configuration, the crown deck is too small to allow the lights 112 to be stored within a perimeter of the handrail 70. The light fixture supports 118 can be configured to horizontally extend a desired distance to position at least a portion of the light fixture attachment 116 outside of the handrail 70 while not engaging the handrail 70. Outside of the handrail 70 refers to a location that is radially positioned at a horizontal distance away from the handrail 70 in a direction away from a center of the crown deck 80.

Various Embodiments

Embodiment 1. A system for illuminating a rig site, the system comprising:
a crown deck mounted to a rig at a rig site, the crown deck comprising a handrail positioned along at least a portion of an outer perimeter of the crown deck;
a support structure mounted to the crown deck, the support structure comprising a plurality of horizontal supports rigidly attached to a plurality of vertical supports, wherein the plurality of horizontal supports are supported at a vertical elevation above the crown deck by the plurality of vertical supports, with the plurality of vertical supports welded to a top surface of the crown deck; and
a plurality of light fixture assemblies mounted to the plurality of horizontal supports, wherein each one of the plurality of light fixture assemblies is rotatable, relative to the plurality of horizontal supports, between a stowed position and a deployed position, wherein the stowed position locates a respective one of the plurality of light fixture assemblies radially spaced away from an outer perimeter of the crown deck and toward a center of the crown deck.

Embodiment 2. The system of embodiment 1, wherein each one of the plurality of light fixture assemblies comprises:
a light fixture bracket; and
a light rotationally connected to the light fixture bracket and being selectively rotatable relative to the light fixture bracket.

Embodiment 3. The system of embodiment 2, wherein the light fixture bracket is removably attached to a light fixture attachment, and wherein the light fixture attachment is rigidly coupled to one of the plurality of horizontal supports.

Embodiment 4. The system of embodiment 3, wherein the light fixture attachment is rigidly coupled to a light fixture support, and wherein the light fixture support is rigidly coupled to the one of the plurality of horizontal supports.

Embodiment 5. The system of embodiment 2, wherein the light fixture bracket is U-shaped, extends along opposite sides of the light, and is rotationally coupled to the light on each of the opposite sides at a pivot axis.

Embodiment 6. The system of embodiment 2, wherein the light comprises multiple lights.

Embodiment 7. The system of embodiment 1, wherein the plurality of vertical supports is positioned on the crown deck radially spaced away from the handrail toward a center of the crown deck.

Embodiment 8. The system of embodiment 1, wherein when each of the plurality of light fixture assemblies are rotated to the stowed position, the crown deck is configured to be transported to a new rig site.

Embodiment 9. The system of embodiment 1, wherein the crown deck comprises a left portion, a middle portion, and a right portion; wherein the left portion and the right portion of the crown deck are rotationally coupled to opposite sides of the middle portion of the crown deck, and when the left portion and right portion are rotated upward by a predetermined angle relative to the middle portion, the crown deck is configured for transport to a new rig site.

Embodiment 10. The system of embodiment 9, wherein the handrail comprises a second left portion attached to the left portion of the crown deck, a second middle portion attached to the middle portion of the crown deck, and a second right portion attached to the right portion of the crown deck.

Embodiment 11. The system of embodiment 10, wherein the left portion and second left portion rotate together in a first direction relative to the middle portion, and wherein the right portion and second right portion rotate together in a second direction relative to the middle portion.

Embodiment 12. The system of embodiment 11, wherein the first direction is opposite the second direction.

Embodiment 13. The system of embodiment 9, wherein the plurality of vertical supports are welded to the middle portion of the crown deck, with the plurality of horizontal supports positioned at a vertical elevation that is above the handrail, wherein the plurality of horizontal supports extend outward from the middle portion of the crown deck over the left portion and the right portion of the crown deck.

Embodiment 14. The system of embodiment 13, wherein at least one of the plurality of light fixture assemblies is positioned over each of four sides of the crown deck and attached to at least one of the plurality of horizontal supports.

Embodiment 15. The system of embodiment 1, wherein each of the plurality of vertical supports are welded to a top surface of the crown deck at one end and welded to one of the plurality of horizontal supports at an opposite end.

Embodiment 16. The system of embodiment 1, wherein when each one of the plurality of light fixture assemblies is rotated to the deployed position, illumination from each of the plurality of light fixture assemblies is directed downward.

Embodiment 17. A system for illuminating a rig site, the system comprising:
a crown deck mounted to a rig at a rig site, the crown deck comprising a left portion, a middle portion, and a right portion, with the left portion and the right portion rotationally attached to opposite sides of the middle portion;
a handrail, with portions of the handrail positioned along at least a portion of an outer perimeter of the crown deck formed by the left portion, middle portion, and right portion;
a support structure mounted to the middle portion of the crown deck, the support structure comprising a plurality of horizontal supports rigidly attached to a plurality of vertical supports, wherein the plurality of horizontal supports are supported at a vertical elevation above the handrail by the plurality of vertical supports, with the plurality of vertical supports welded to a top surface of the middle portion of the crown deck; and
a plurality of light fixture assemblies mounted to the plurality of horizontal supports, wherein each one of the plurality of light fixture assemblies is rotatable, relative to the plurality of horizontal supports, between a stowed position and a deployed position, wherein the stowed position locates a respective one of the plurality of light fixture assemblies radially spaced away from an outer perimeter of the crown deck and toward a center of the crown deck.

Embodiment 18. The system of embodiment 17, wherein each one of the plurality of light fixture assemblies comprises:
a light fixture bracket; and
a light rotationally connected to the light fixture bracket and being selectively rotatable relative to the light fixture bracket.

Embodiment 19. The system of embodiment 18, wherein the light fixture bracket is removably attached to a light fixture attachment, and wherein the light fixture attachment is rigidly coupled to one of the plurality of horizontal supports.

Embodiment 20. The system of embodiment 17, wherein the plurality of vertical supports is positioned on the middle portion of the crown deck radially spaced away from the handrail toward a center of the crown deck.

While the present disclosure may be susceptible to various modifications and alternative forms, specific embodiments have been shown by way of example in the drawings and tables and have been described in detail herein. However, it should be understood that the embodiments are not intended to be limited to the particular forms disclosed. Rather, the disclosure is to cover all modifications, equivalents, and alternatives falling within the spirit and scope of the disclosure as defined by the following appended claims.

Further, although individual embodiments are discussed herein, the disclosure is intended to cover all combinations of these embodiments.

What is claimed is:

1. A system for illuminating a rig site, the system comprising:
a crown deck mounted to a rig at a rig site, the crown deck comprising a left portion, a middle portion, a right portion, and a handrail positioned along at least a portion of an outer perimeter of the crown deck, wherein the left portion and the right portion of the crown deck are rotationally coupled to opposite sides of the middle portion of the crown deck, and when the left portion and the right portion are rotated upward by a pre-determined angle relative to the middle portion, the crown deck is configured for transport to a new rig site, and wherein the handrail comprises a second left portion attached to the left portion of the crown deck, a second middle portion attached to the middle portion of the crown deck, and a second right portion attached to the right portion of the crown deck;
a support structure mounted to the crown deck, the support structure comprising a plurality of horizontal supports rigidly attached to a plurality of vertical supports, wherein the plurality of horizontal supports are supported at a vertical elevation above the crown deck by the plurality of vertical supports, with the plurality of vertical supports welded to a top surface of the crown deck; and
a plurality of light fixture assemblies mounted to the plurality of horizontal supports, wherein each one of the plurality of light fixture assemblies is rotatable, relative to the plurality of horizontal supports, between a stowed position and a deployed position, wherein the stowed position locates a respective one of the plurality of light fixture assemblies radially spaced away from an outer perimeter of the crown deck and toward a center of the crown deck.

2. The system of claim 1, wherein each one of the plurality of light fixture assemblies comprises:
a light fixture bracket; and
a light rotationally connected to the light fixture bracket and being selectively rotatable relative to the light fixture bracket.

3. The system of claim 2, wherein the light fixture bracket is removably attached to a light fixture attachment, and wherein the light fixture attachment is rigidly coupled to one of the plurality of horizontal supports.

4. The system of claim 3, wherein the light fixture attachment is rigidly coupled to a light fixture support, and wherein the light fixture support is rigidly coupled to the one of the plurality of horizontal supports.

5. The system of claim 2, wherein the light fixture bracket is U-shaped, extends along opposite sides of the light, and is rotationally coupled to the light on each of the opposite sides at a pivot axis.

6. The system of claim 2, wherein the light comprises multiple lights.

7. The system of claim 1, wherein the plurality of vertical supports is positioned on the crown deck radially spaced away from the handrail toward a center of the crown deck.

8. The system of claim 1, wherein when each of the plurality of light fixture assemblies are rotated to the stowed position, the crown deck is configured to be transported to a new rig site.

9. The system of claim 1, wherein the left portion and second left portion rotate together in a first direction relative to the middle portion, and wherein the right portion and second right portion rotate together in a second direction relative to the middle portion.

10. The system of claim 9, wherein the first direction is opposite the second direction.

11. The system of claim 1, wherein the plurality of vertical supports are welded to the middle portion of the crown deck, with the plurality of horizontal supports positioned at a vertical elevation that is above the handrail, wherein the plurality of horizontal supports extend outward from the middle portion of the crown deck over the left portion and the right portion of the crown deck.

12. The system of claim 11, wherein at least one of the plurality of light fixture assemblies is positioned over each of four sides of the crown deck and attached to at least one of the plurality of horizontal supports.

13. The system of claim 1, wherein each of the plurality of vertical supports are welded to a top surface of the crown deck at one end and welded to one of the plurality of horizontal supports at an opposite end.

14. The system of claim 1, wherein when each one of the plurality of light fixture assemblies is rotated to the deployed position, illumination from each of the plurality of light fixture assemblies is directed downward.

15. A system for illuminating a rig site, the system comprising:
  a crown deck mounted to a rig at a rig site, the crown deck comprising a left portion, a middle portion, and a right portion, wherein the left portion and the right portion rotationally attached to opposite sides of the middle portion, and when the left portion and the right portion are rotated upward by a pre-determined angle relative to the middle portion, the crown deck is configured for transport to a new rig site;
  a handrail, with portions of the handrail positioned along at least a portion of an outer perimeter of the crown deck formed by the left portion, middle portion, and right portion, wherein the handrail comprises a second left portion attached to the left portion of the crown deck, a second middle portion attached to the middle portion of the crown deck, and a second right portion attached to the right portion of the crown deck;
  a support structure mounted to the middle portion of the crown deck, the support structure comprising a plurality of horizontal supports rigidly attached to a plurality of vertical supports, wherein the plurality of horizontal supports are supported at a vertical elevation above the handrail by the plurality of vertical supports, with the plurality of vertical supports welded to a top surface of the middle portion of the crown deck; and
  a plurality of light fixture assemblies mounted to the plurality of horizontal supports, wherein each one of the plurality of light fixture assemblies is rotatable, relative to the plurality of horizontal supports, between a stowed position and a deployed position, wherein the stowed position locates a respective one of the plurality of light fixture assemblies radially spaced away from an outer perimeter of the crown deck and toward a center of the crown deck.

16. The system of claim 15, wherein each one of the plurality of light fixture assemblies comprises:
  a light fixture bracket; and
  a light rotationally connected to the light fixture bracket and being selectively rotatable relative to the light fixture bracket.

17. The system of claim 16, wherein the light fixture bracket is removably attached to a light fixture attachment, and wherein the light fixture attachment is rigidly coupled to one of the plurality of horizontal supports.

18. The system of claim 15, wherein the plurality of vertical supports is positioned on the middle portion of the crown deck radially spaced away from the handrail toward a center of the crown deck.

19. The system of claim 15, wherein the left portion and second left portion rotate together in a first direction relative to the middle portion, and wherein the right portion and second right portion rotate together in a second direction relative to the middle portion.

20. The system of claim 19, wherein the first direction is opposite the second direction.

* * * * *